US012109809B2

(12) United States Patent
Hayashi et al.

(10) Patent No.: US 12,109,809 B2
(45) Date of Patent: Oct. 8, 2024

(54) LIQUID DISCHARGE APPARATUS

(71) Applicant: BROTHER KOGYO KABUSHIKI KAISHA, Nagoya (JP)

(72) Inventors: Masayoshi Hayashi, Nagoya (JP); Ryuji Horata, Gamagori (JP); Takafumi Nakase, Nagoya (JP); Nobumasa Tanaka, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 207 days.

(21) Appl. No.: 17/937,802

(22) Filed: Oct. 4, 2022

(65) Prior Publication Data

US 2023/0127484 A1 Apr. 27, 2023

(30) Foreign Application Priority Data

Oct. 25, 2021 (JP) ................................ 2021-174066

(51) Int. Cl.
*B41J 2/045* (2006.01)
*B41J 2/14* (2006.01)

(52) U.S. Cl.
CPC .......... *B41J 2/0457* (2013.01); *B41J 2/0451* (2013.01); *B41J 2/14* (2013.01); *B41J 2002/14403* (2013.01)

(58) Field of Classification Search
CPC .. B41J 2/04581; B41J 2/04541; B41J 2/0451; B41J 2/16579; B41J 2/16508; B41J 2002/14491; B41J 2/04586; B41J 2/04548; B41J 2/16532; B41J 2/0457; B41J 2/14; B41J 2002/14403
See application file for complete search history.

(56) References Cited

U.S. PATENT DOCUMENTS

2012/0236063 A1* 9/2012 Nakazawa ........... B41J 2/16579 347/19
2023/0089979 A1* 3/2023 Tanaka .................. B41J 2/2142 347/50

FOREIGN PATENT DOCUMENTS

JP 2007-136858 A 6/2007
JP 2012-210768 A 11/2012

* cited by examiner

*Primary Examiner* — Jannelle M Lebron
(74) *Attorney, Agent, or Firm* — Merchant & Gould P.C.

(57) ABSTRACT

There is provided a liquid discharge apparatus including: a liquid discharge head having a nozzle; an electrode facing the nozzle; a power supply which generates a potential difference between the liquid discharge head and the electrode; a first output unit which outputs a first signal in accordance with an electric change in a case that the liquid discharge head is caused to perform inspection driving; a low-pass filter; a second output unit; a high-pass filter; a third output unit; and a controller. The controller executes determination as to whether or not the liquid is normally discharged from the nozzle, based on the first signal; and determination as to whether or not a short circuit occurs between the liquid discharge head and the electrode, based on a second signal output from the second output unit and a third signal output from the third output unit.

12 Claims, 11 Drawing Sheets

LIQUID DISCHARGE APPARATUS

REFERENCE TO RELATED APPLICATIONS

This application claims priority from Japanese Patent Application No. 2021-174066 filed on Oct. 25, 2021. The entire content of the priority application is incorporated herein by reference.

BACKGROUND ART

As an example of a liquid discharge apparatus which discharges or ejects a liquid from nozzles, there is a publicly known ink-jet printer which discharges an ink from nozzles so as to perform recording. In a certain publicly known ink-jet printer, a capping member covering the nozzles is provided with an inspection area which includes an electrode member. Further, an inspection as to whether or not the ink is discharged normally from the nozzles is performed, based on a change in the voltage in the inspection area in a case that an operation of causing a print head to discharge the ink from the nozzles toward the inspection area is performed in a state that any potential difference is generated between the print head and the inspection area. Furthermore, in the above-described publicly known ink-jet printer, in the case of performing the above-described inspection, an actually measured voltage is measured between the print head and the inspection area. Moreover, in a case that the actually measured voltage is lower than an inspection permissible range, it is determined that the print head and the electrode member are short-circuited and a leakage current is flowing therebetween; the print head and the capping member are separated from each other, and the ink accumulating in the capping member is exhausted by a suction pump.

DESCRIPTION

According to an aspect of the present disclosure, there is provided a liquid discharge apparatus including: a liquid discharge head; an electrode; a power supply; a first output unit; a low-pass filter; a second output unit; a high-pass filter; a third output unit and a controller. A nozzle is opened in the liquid discharge head. The electrode faces the nozzle. The power supply is configured to apply voltage to the liquid discharge head so as to generate a potential difference between the liquid discharge head and the electrode. The first output unit is electrically connected to either one of the electrode and the liquid discharge head, and configured to output a first signal in accordance with an electric change in a case that the liquid discharge head is caused to perform inspection driving for discharging the liquid from the nozzle toward the electrode in a state that the liquid discharge head and the electrode are caused to face each other. The low-pass filter is electrically connected to the liquid discharge head. The second output unit is electrically connected to the liquid discharge head via the low-pass filter. The high-pass filter is electrically connected to the liquid discharge head. The third output unit is electrically connected to the liquid discharge head via the high-pass filter. The controller configured to execute: determination as to whether or not the liquid is normally discharged from the nozzle, based on the first signal; and determination as to whether or not a short circuit occurs between the liquid discharge head and the electrode, based on a second signal output from the second output unit and a third signal output from the third output unit.

According to the above-described configuration, it is possible to determine whether or not the liquid is normally discharged from the nozzle, based on the first signal output from the first output unit. Further, in a case that a continuous short circuit occurs between the liquid discharge head and the electrode, a DC component (Direct Current component) of the voltage of the liquid discharge head is changed. In the above-described configuration, since the second output unit is connected to the liquid discharge head via the low-pass filter, the second signal output from the second output unit is consequently a signal in accordance with the DC component of the voltage of the liquid discharge head. With this, it is possible to detect that the continuous short circuit occurs between the liquid discharge head and the electrode, based on the second signal. Further, in the case that a temporary short circuit occurs between the liquid discharge head and the electrode, the voltage of the liquid discharge head changed abruptly or suddenly, which in turn generates a high frequency component in the voltage of the liquid discharge head. In the above-described configuration, since the third output unit is connected to the liquid discharge head via the high-pass filter, the third signal output from the third output unit is consequently a signal in accordance with the high frequency component of the voltage of the liquid discharge head. With this, it is possible to detect that the temporary short circuit occurs between the liquid discharge head and the electrode, based on the third signal.

Figure 5A:
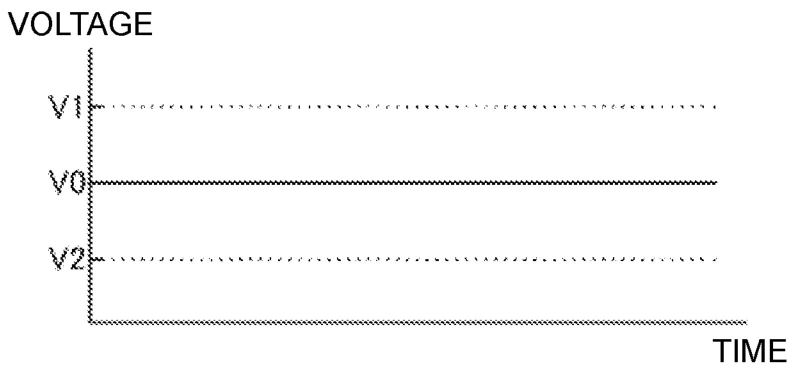
Figure 5B:
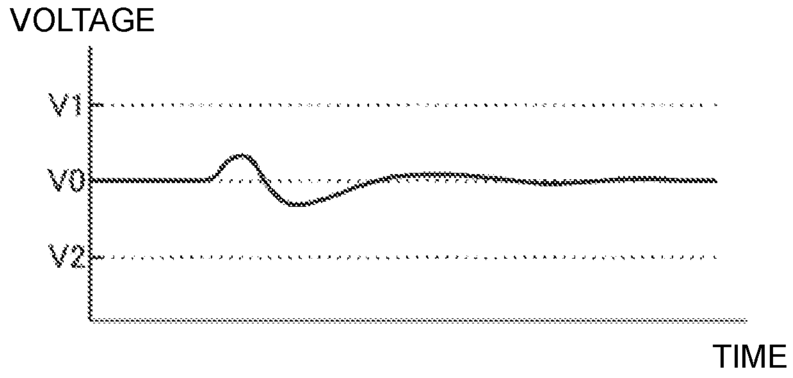
Figure 5C:
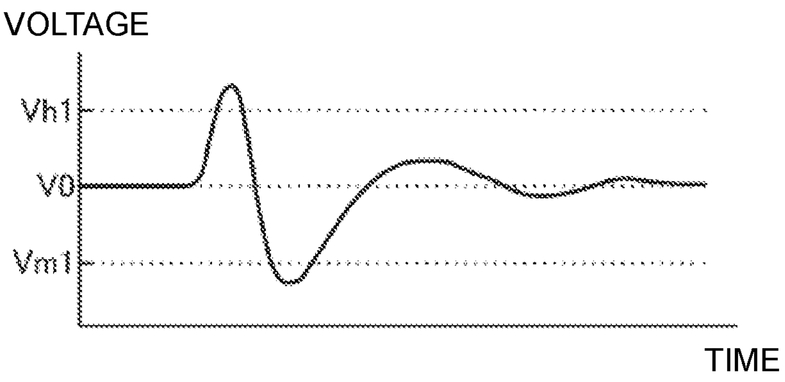

FIG. 5A is a view for explaining a signal transmitted from a high-pass filter toward a first output unit in a case that an ink is not discharged from a nozzle in an inspecting driving, and a signal output from the first output unit; FIG. 5B is a view for explaining a signal transmitted from the high-pass filter toward the first output unit in a case that the ink is discharged from the nozzle in the inspecting driving; and FIG. 5C is a view for explaining a signal output from the first output unit in the case that the ink is discharged from the nozzle in the inspecting driving.

Figure 6:
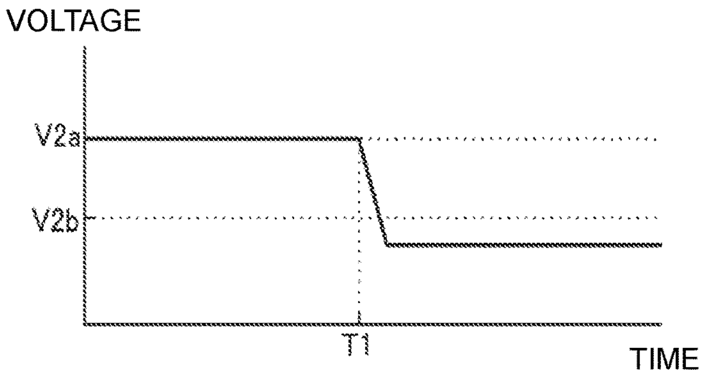

FIG. 6 is a view for explaining a signal output from a second output unit.

Figure 7A:
Figure 7B:
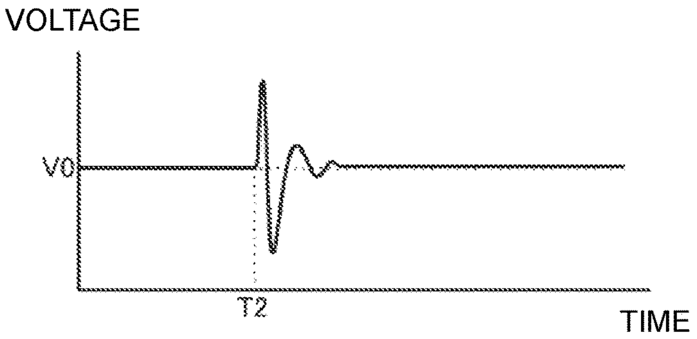
Figure 7C:
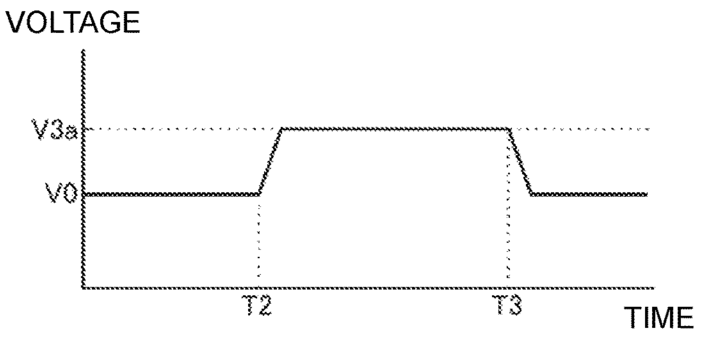

FIG. 7A is a view for explaining a signal received by a latched circuit in a case that a temporary short circuit does not occur; FIG. 7B is a view for explaining a signal received by the latched circuit in a case that the temporary short circuit occurs; and FIG. 7C is a view for explaining a signal output from the latched circuit (third output unit).

Figure 8A:
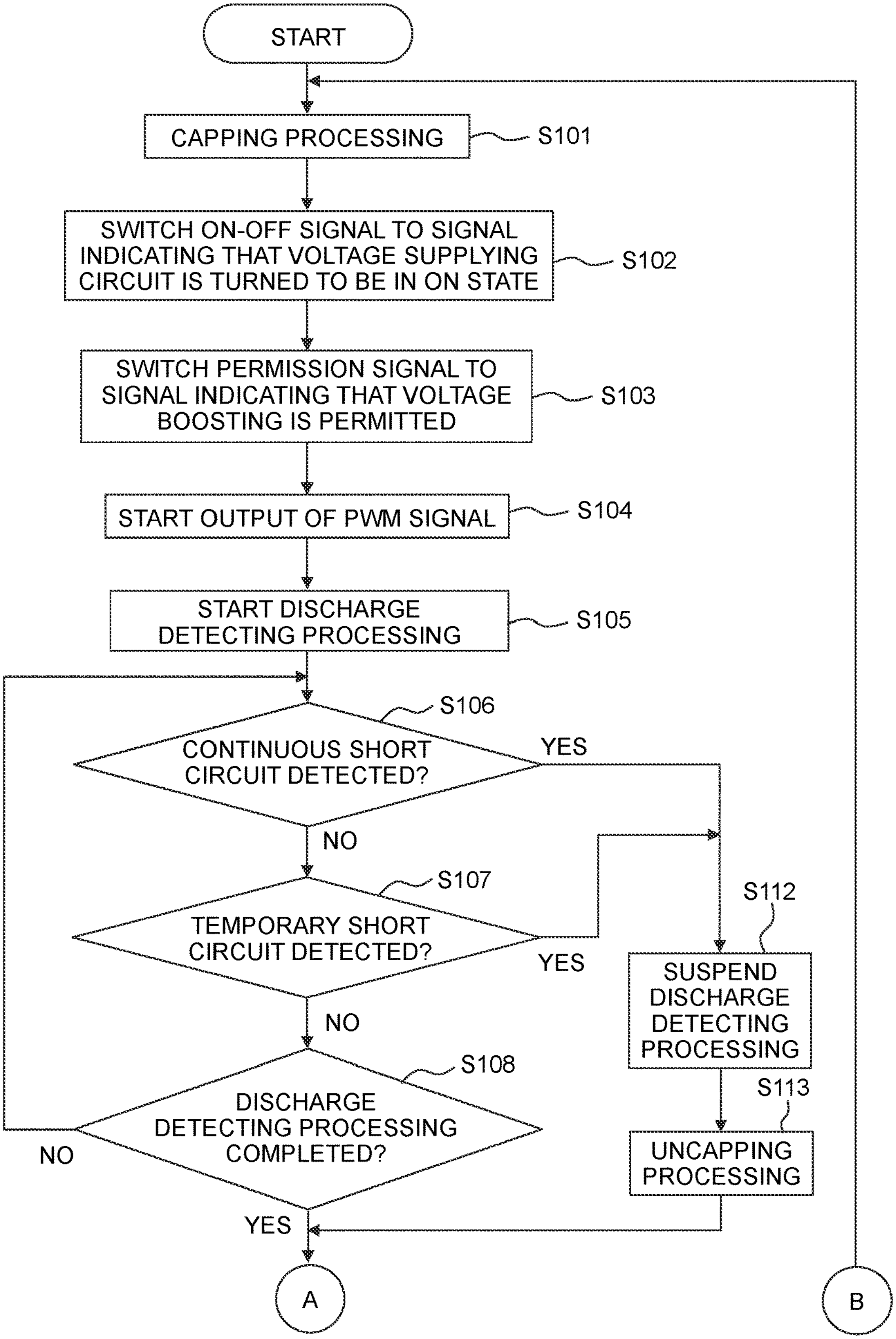
Figure 8B:
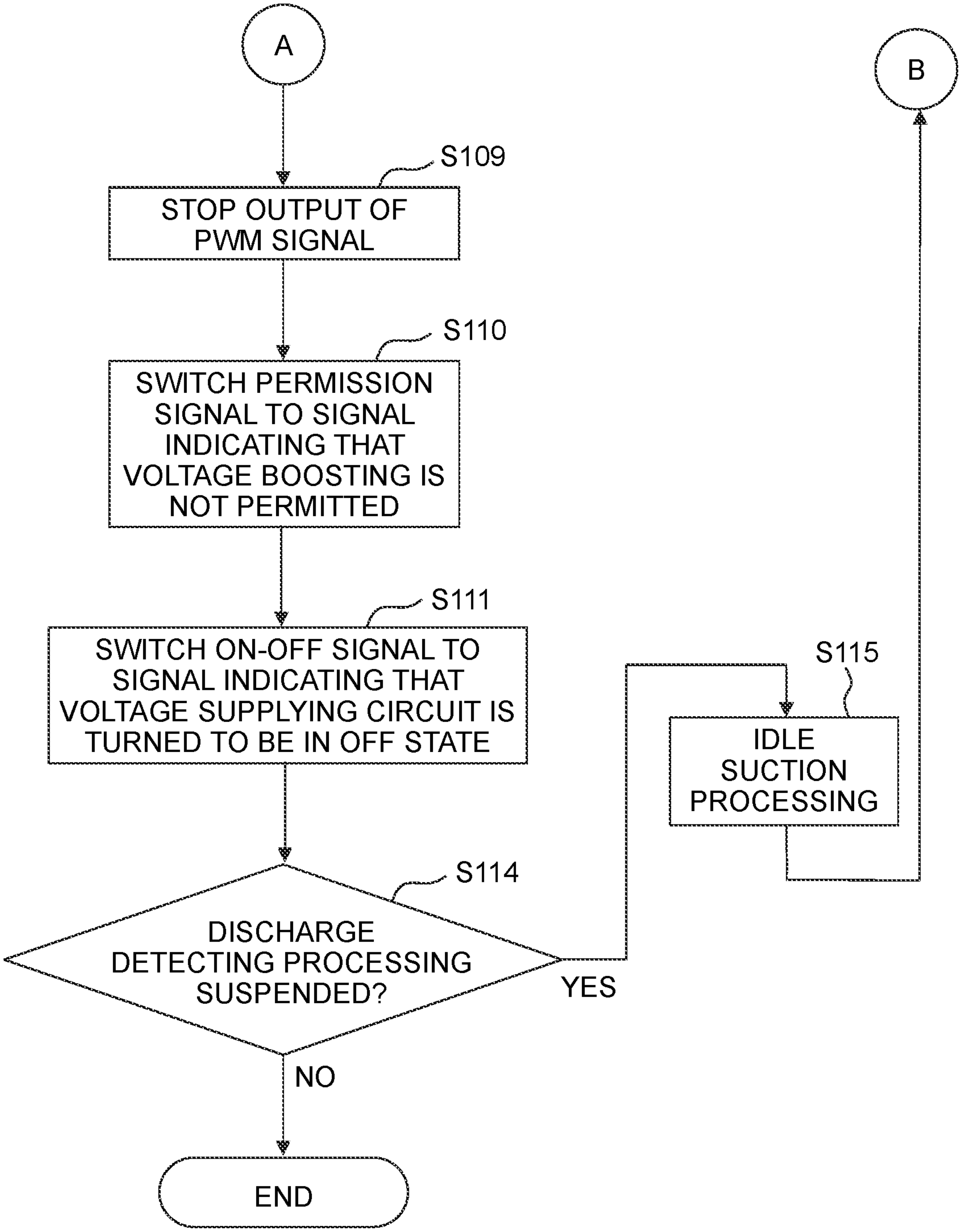

FIGS. 8A and 8B depict a flow chart indicating the flow of a processing in a case that an inspection instruction signal is received.

Figure 9:
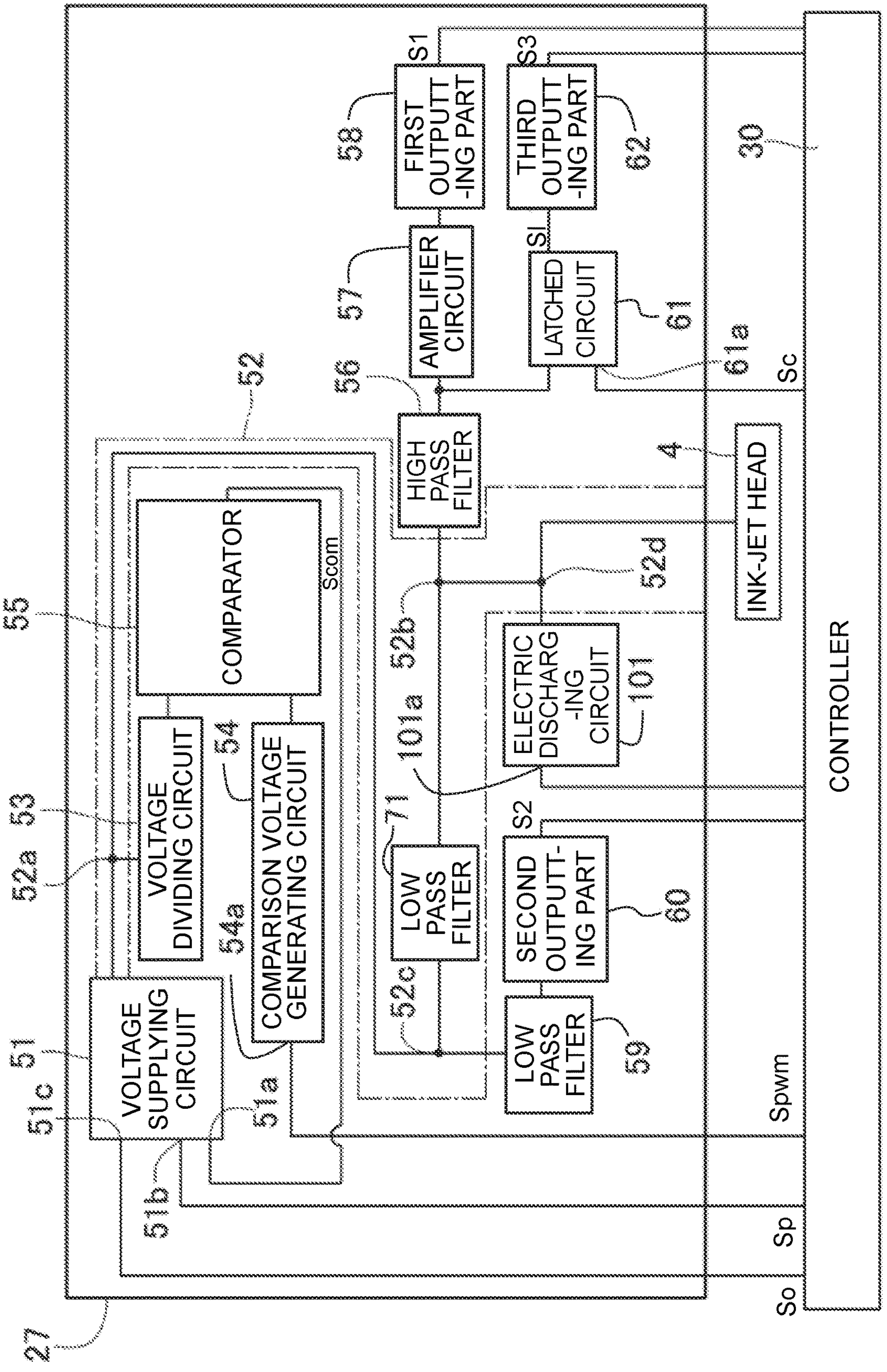

FIG. 9 is a block diagram depicting the configuration of an inspection circuit in an example wherein an electric discharge instruction signal Sd is output from a controller to an electric discharging circuit.

Figure 10A:
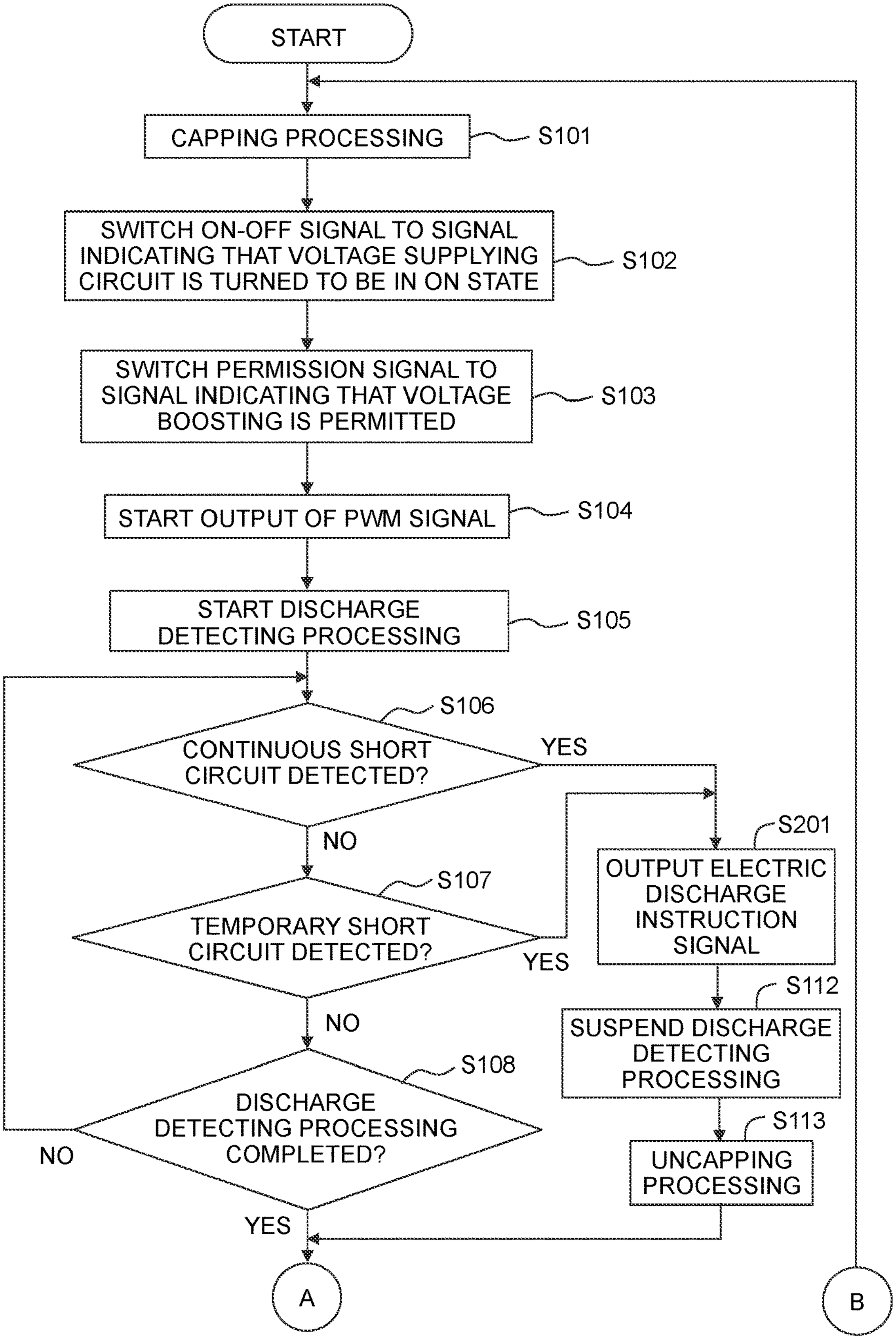
Figure 10B:
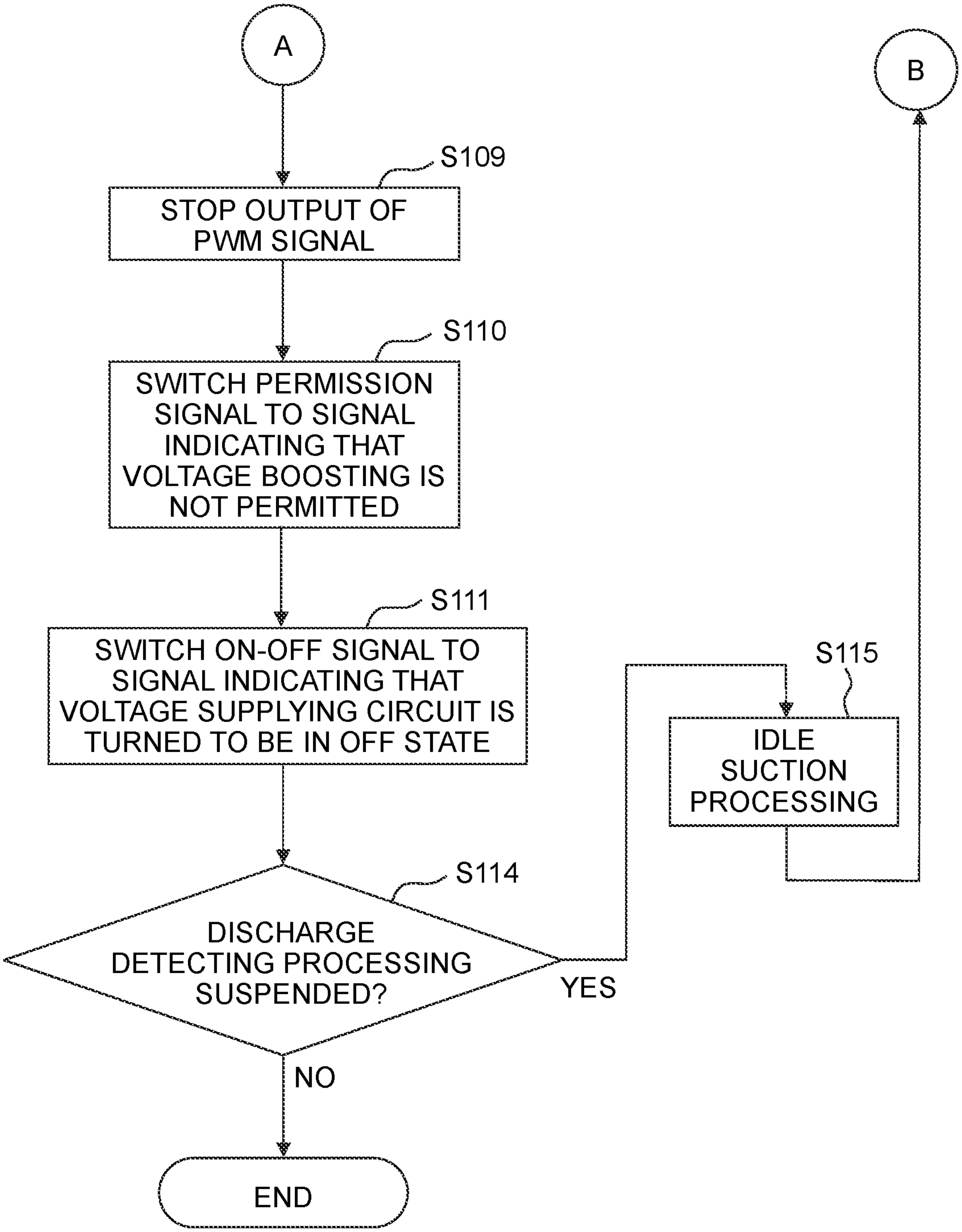

FIGS. 10A and 10B depict a flow chart indicating the flow of a processing in a case that the inspection instruction signal is received in the example of FIG. 9.

Figure 11:
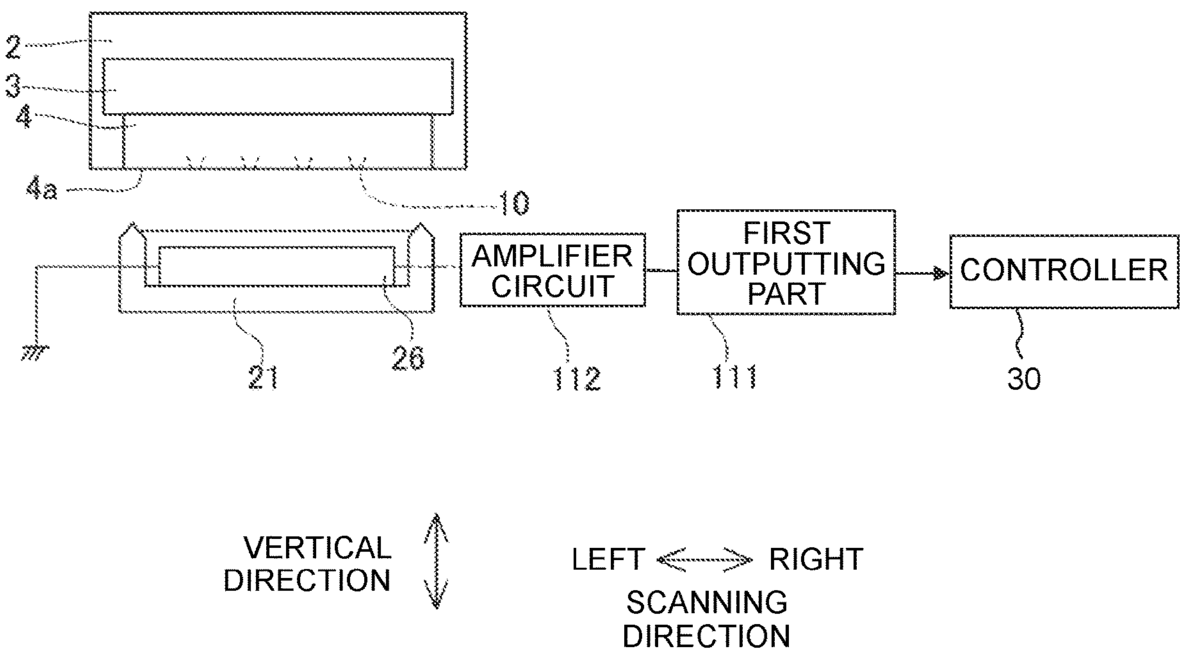

FIG. 11 is a view for explaining an example wherein the electrode and the first output unit are electrically connected.

In the above-described publicly known ink-jet printer, in a case that a continuous short circuit occurs between the print head and the inspection area, the leakage current flows continuously between the print head and the inspection area.

Accordingly, a state that the voltage between the print head and the inspection area is lower than the inspection permissible range is continued. Further, the above-described publicly known ink-jet printer determines whether or not the continuous short circuit occurs between the print head and the inspection area based on whether or not the voltage between the print head and the inspection area is lower than the inspection permissible range. On the other hand, for example, there is also such a case that any temporary short circuit occurs between the print head and the inspection area, due to a temporary electrical discharge between the print head and the inspection area. In this case, since the leakage current flows between the print head and the inspection area merely temporarily, it is necessary to detect a temporary change in the voltage. In the configuration of the above-described publicly known ink-jet printer by which the continuous short circuit is detected between the print head and the inspection area, however, there is such a fear that the temporary change in the voltage as described above might not be detected. In a case that a temporary short circuit occurs between the print head and the inspection area, there is such a fear that a similar temporary short circuit might occur repeatedly and/or that the temporary short circuit might be changed to a continuous short circuit between the print head and the inspection area. Accordingly, it is desired to be capable of detecting that the short circuit occurs between the print head and the inspection area also in a case that the temporary short circuit occurs between the print head and the inspection area, in addition to the case that the continuous short circuit occurs between the print head and the inspection area.

An object of the present disclosure is to provide a liquid discharge apparatus capable of precisely detecting in either one of a case that a continuous short circuit occurs between a liquid discharge head and an electrode receiving a liquid discharged from a nozzle of the liquid discharge head, and a case that a temporary short circuit occurs between the liquid discharge head and the electrode.

In the following, an embodiment of the present disclosure will be described.

<Overall Configuration of Printer>

Figure 1:
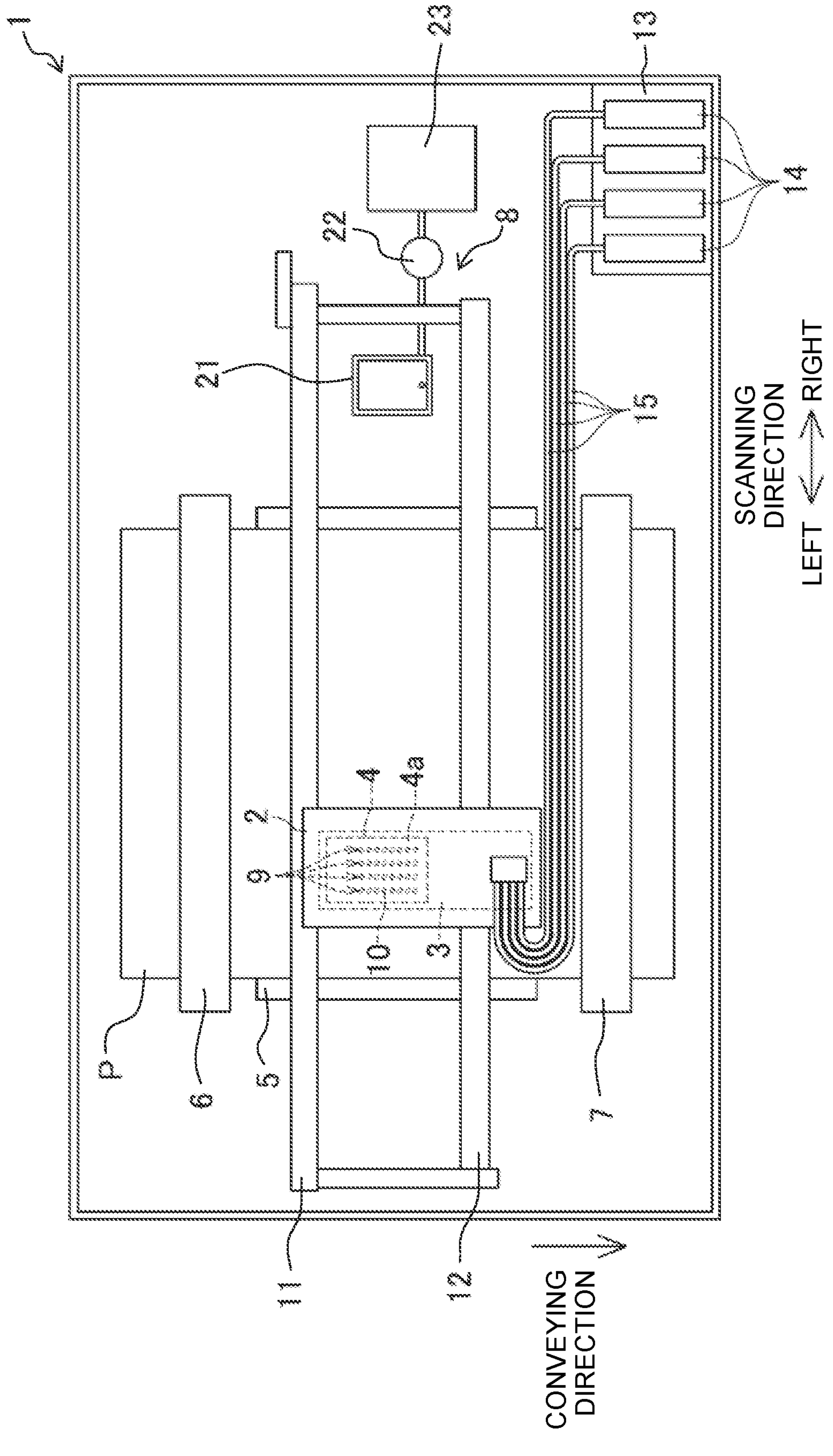
FIG. 1 is a view schematically depicting the configuration of a printer 1.

As depicted in FIG. 1, a printer 1 according to the present embodiment (an example of a "liquid discharge apparatus" of the present disclosure) is provided with a carriage 2, a sub tank 3, an ink-jet head 4 (an example of a "liquid discharge head" of the present disclosure), a platen 5, conveying rollers 6 and 7, a maintenance unit 8, etc.

The carriage 2 is supported by two guide rails 11 and 12 extending in a scanning direction. The carriage 2 is connected to a carriage motor 36 (see FIG. 3) via a non-illustrate belt, etc.; in a case that the carriage motor 36 is driven, the carriage 2 moves in the scanning direction along the guide rails 11 and 12. Note that in the following description, the right side and the left side in the scanning direction are defined as depicted in FIG. 1.

The sub tank 3 is mounted on the carriage 2. Here, the printer 1 is provided with a cartridge holder 13, and four ink cartridges 14 are installed in the cartridge holder 13 to be attachable and detachable with respect to the cartridge holder 13. The four ink cartridges 14 are arranged side by side in the scanning direction, and store a black ink, a yellow ink, a cyan ink and a magenta ink (each of which is an example of a "liquid" of the present disclosure"), respectively, in this order from an ink cartridge 4 included in the four ink cartridges 4 and arranged on the right (rightmost) side in the scanning direction. The sub tank 3 is connected to the four ink cartridges 14, which are installed in the cartridge holder 13, via four tubes 15, respectively. With this, the above-described four color inks are supplied from the four ink cartridges 14, respectively, to the sub tank 3.

The ink-jet head 4 is installed in the carriage 2, and is connected to a lower end part of the sub tank 3. The four color inks are supplied from the sub tank 3 to the ink-jet head 4. Further, the ink-jet head 4 ejects or discharges the inks from a plurality of nozzles 10 formed in a nozzle surface **4*a* which is the lower surface of the ink-jet head 4. To provide a more specific explanation, the plurality of nozzles 10 are aligned in a conveying direction orthogonal to the scanning direction to thereby form a nozzle row (nozzle array) 9; four pieces of the nozzle row 9 are arranged side by side in the scanning direction in the nozzle surface 4*a*. The black, yellow, cyan, and magenta inks are discharged from the plurality of nozzles 10, in an order from a nozzle row 9 which is included in the four nozzle rows 9 and which is located on the right (rightmost) side in the scanning direction. Further, the ink-jet head 4 is connected to an inspection circuit 27 (see FIGS. 3 and 4). The inspection circuit 27 is controlled by a controller 30 (see FIGS. 3 and 4). The inspection circuit 27 and the controller 30** will be explained in detail later on.

The platen 5 is arranged at a location below the ink-jet head 4, and faces (is opposite to) the plurality of nozzles 10. The platen 5 extends over the entire length of a recording paper sheet P (recording paper P, recording sheet P) in the scanning direction, and supports the recording paper sheet P from therebelow. The conveying roller 6 is arranged at the upstream side in the conveying direction with respect to the ink-jet head 4 and the platen 5. The conveying roller 7 is arranged at the downstream side in the conveying direction with respect to the ink-jet head 4 and the platen 5. The conveying rollers 6 and 7 are connected to a conveying motor 37 (see FIG. 3) via a non-illustrated gear, etc. In a case that the conveying motor 37 is driven, the conveying rollers 6 and 7 are rotated to thereby convey the recording paper sheet P in the conveying direction.

The maintenance unit 8 is provided with a cap 21, a suction pump 22 and a waste liquid tank 23. The cap 21 is arranged at the right side in the scanning direction with respect to the platen 5. Further, in a case that the carriage 2 is positioned in a maintenance position which is on the right side in the scanning direction with respect to the platen 5, the plurality of nozzles 10 face or are opposite to the cap 21.

Figure 3:
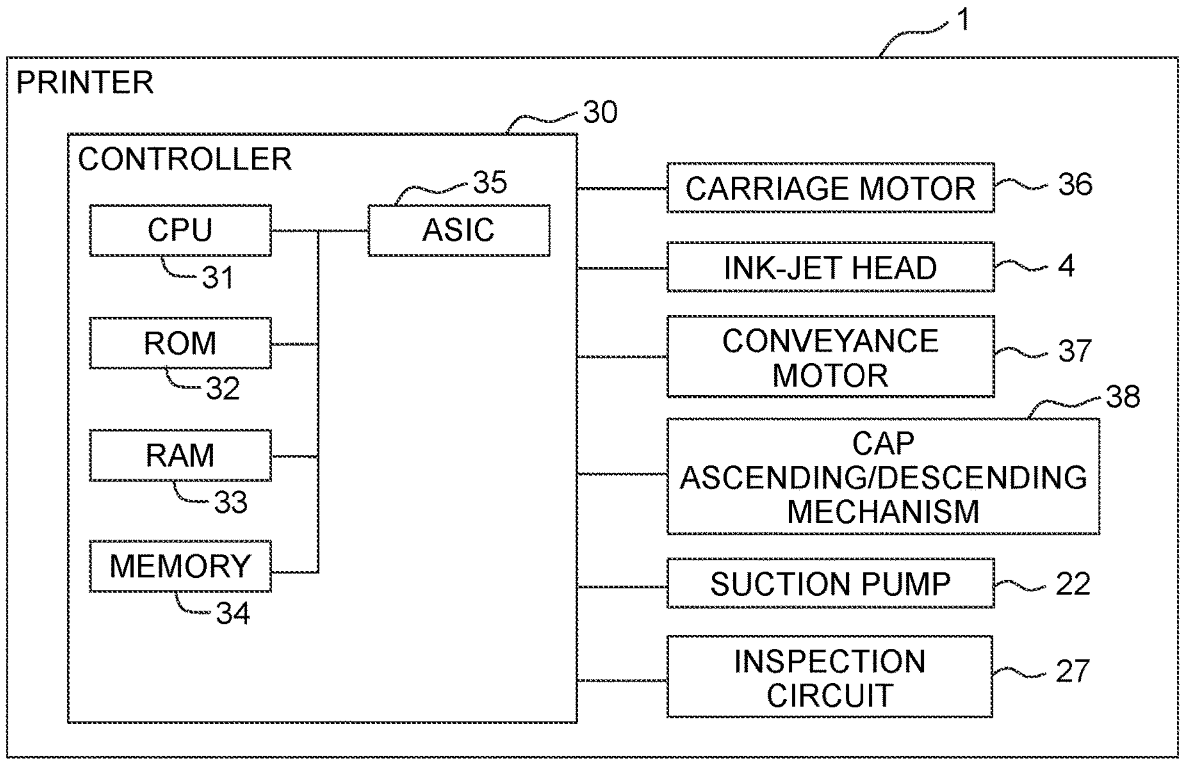
FIG. 3 is a block diagram depicting the electrical configuration of the printer 1.

Further, the cap 21 is configured to be movable upward and downward by a cap lifting-lowering mechanism 38 (see FIG. 3). Further, in a case that the cap 21 is moved upward by the cap lifting-lowering mechanism 38 in a state that the cap 2 is positioned in the maintenance position to thereby cause the plurality of nozzles 10 to face the cap 21, an upper end part of the cap 21 makes tight contact with the nozzle surface **4*a*, thereby providing a cap state in which the plurality of nozzles 10 are covered by the cap 21. Further, in a state that the cap 21 is lowered by the cap lifting-lowering mechanism 38, there is provided an uncap state in which the plurality of nozzles 10 are not covered by the cap 21. Note that the cap 21 is not limited to or restricted by being such a cap that makes tight contact with the nozzle surface 4*a* to thereby cover the plurality of nozzles 10. The cap 21 may be, for example, such a cap that makes tight contact with a non-illustrated frame, etc., which is arranged in the surrounding of the nozzle surface 4*a* of the ink-jet head 4 to thereby cover the plurality of nozzles 10**.

The suction pump 22 is, for example, a tube pump, etc., and is connected to the cap 21 and the waste liquid tank 23. Further, in the maintenance unit 8, in a case that the suction pump 22 is driven in the above-described cap state, it is possible to perform a so-called suction purge of discharging (exhausting) the ink inside the ink-jet head 4 from the plurality of nozzles 10. The ink discharged (exhausted) by the suction purge is stored in the waste liquid tank 23.

Note that although the explanation is given herein, for the sake of convenience, that the cap 21 is configured to cover all the plurality of nozzles 10 together and that the inks inside the ink-jet head 4 are discharged (exhausted) from all the plurality of nozzles 10 in the suction purge, the configuration of the cap 21 is not limited to or restricted by this. For example, it is allowable to provide such a configuration that the cap 21 is provided with, separately, a part covering nozzles 10, among the plurality of nozzles 10, constructing the rightmost nozzle row 9 included in the four nozzle rows 9 and discharging the blank ink, and another part covering nozzles 10, among the plurality of nozzles 10, constructing three nozzle rows 9 on the left side among the four nozzle rows 9 and discharging the color (yellow, cyan and magenta) inks, and that either one of the black ink and the color inks is (are) selectively discharged in the suction purge. Further, for example, it is allowable to provide such a configuration that the cap 21 is provided as a plurality of caps each of which is provided individually on one of the four nozzle rows 9, and that each of the four color inks is discharged (exhausted), in the suction purge, individually from one of the four nozzles rows 9 in the suction purge.

Further, in the maintenance unit 8, in a case that the suction pump 22 is driven in the above-described uncap state, it is possible to perform a so-called idle suction in which the ink accumulated in the cap 21 is exhausted (discharged) by the suction purge, an inspection driving (to be described later on), etc. The ink exhausted from the cap 21 by the idle suction is also stored in the waste liquid tank 23.

Figure 2:
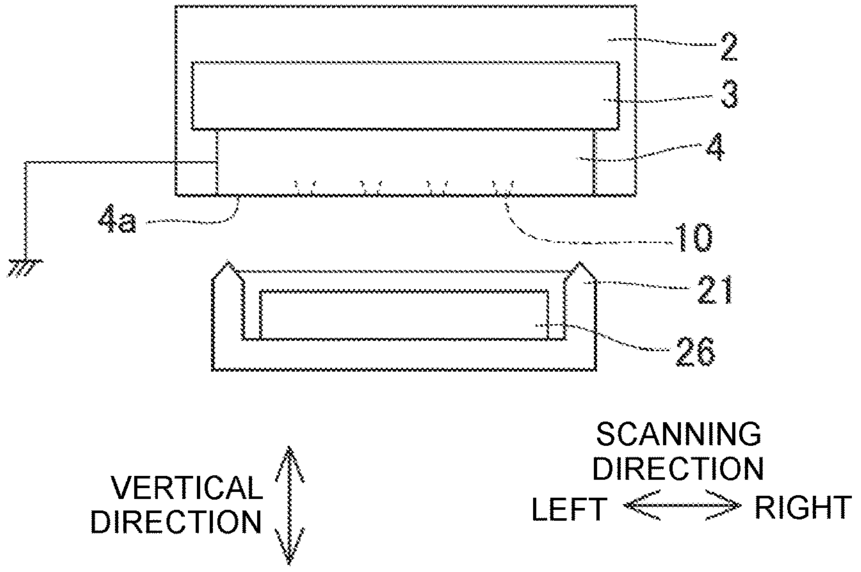
FIG. 2 is a view for explaining an electrode, etc., arranged inside a cap.

Further, as depicted in FIG. 2, an electrode 26 having a rectangular planar shape is arranged in the inside of the cap 21. The electrode 26 is connected to the ground. Further, in the present embodiment, it is possible to determine as to whether or not the ink(s) is (are) discharged normally from the nozzles 10, based on a change in the voltage in the electrode 26 in a case that an inspection driving for causing the ink-jet head 4 to discharge the ink(s) from the nozzle(s) 10 in a state that the cap state is provided and that any potential difference is generated between the ink-jet head 4 and the electrode 26 as will be described later on.

<Electric Configuration of Printer>

Next, the electric configuration of the printer 1 will be described. As depicted in FIG. 3, the printer 1 is provided with the controller 30. The controller 30 include a CPU (Central Processing Unit) 31, a ROM (Read Only Memory) 32, a RAM (Random Access Memory) 33, a memory 34, an ASIC (Application Specific Integrated Circuit) 35, etc. The controller 30 controls the operation of each of the carriage motor 36, the ink-jet head 4, the conveying motor 37, the cap lifting-lowering mechanism 38, the suction pump 22, the inspection circuit 27, etc. Further, the controller 30 receives a signal from the inspection circuit 27.

Note that the controller 30 may be configured such that only the CPU 31 performs the various kinds of processing or that only the ASIC 35 performs the various kinds of processing, or that the CPU 31 and the ASIC 35 perform the various kinds of processing in a cooperative manner. Alternatively, the controller 30 may be configured such that one CPU 31 singly performs the processing, or that a plurality of pieces of the CPU 31 perform the processing in a sharing manner. Still alternatively, the controller 30 may be configured such that one ASIC 35 singly performs the processing, or that a plurality of pieces of the ASIC 35 perform the processing in a sharing manner.

<Inspection Circuit>

Figure 4:
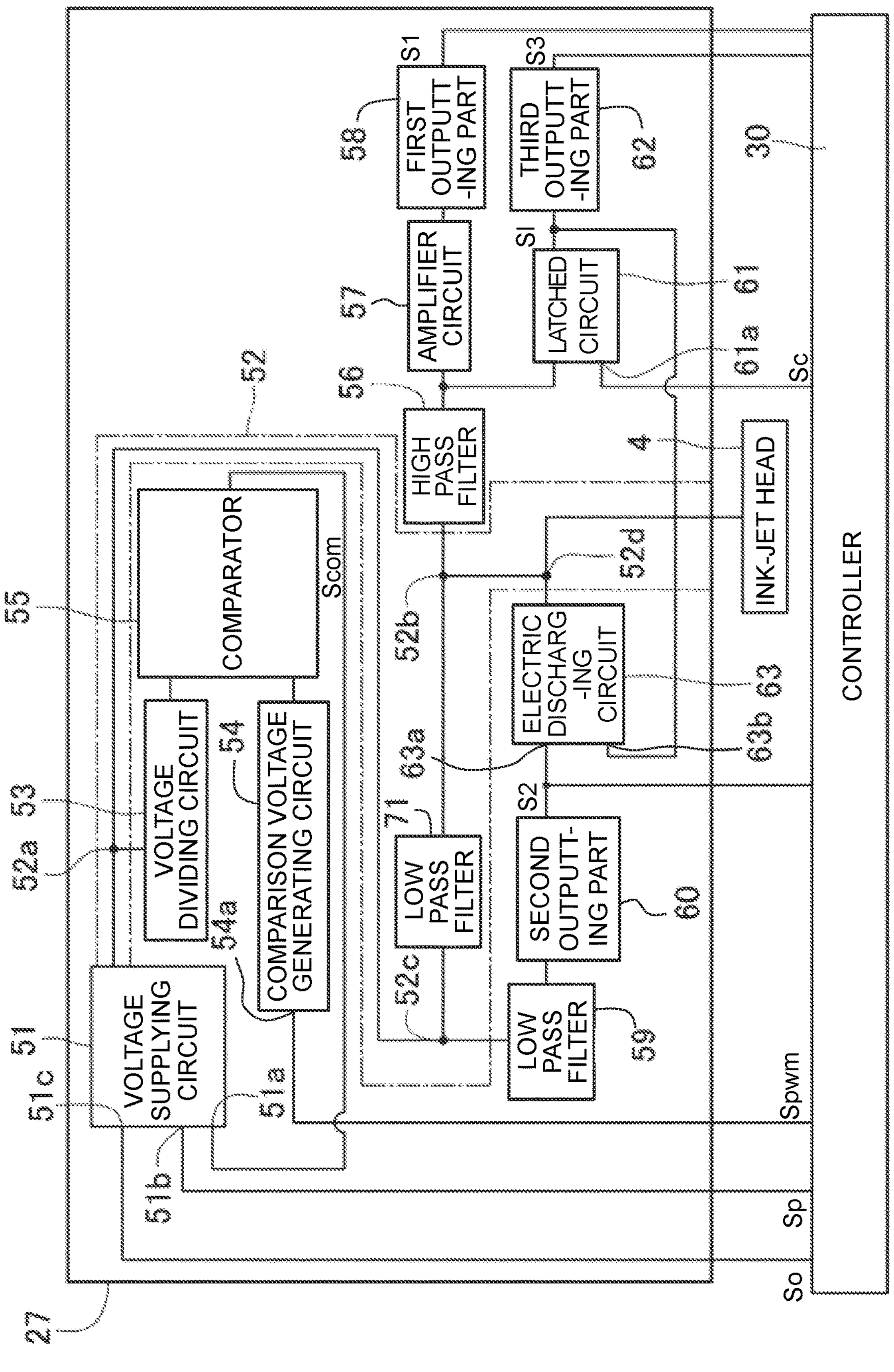
FIG. 4 is a block diagram depicting the configuration of a circuit for inspection (an inspection circuit).

Next, the inspection circuit 27 will be explained. As depicted in FIG. 4, the inspection circuit 27 includes a power supply 51, a main circuit 52, a voltage dividing circuit 53, a comparison voltage generating circuit 54, a comparator 55, a high-pass filter 56, an amplifier circuit 57, a first output unit 58, a low-pass filter 59 (an example of "another low-pass filter" of the present disclosure), a second output unit 60, a latched circuit 61, a third output unit 62, and an electric discharging circuit 63.

The power supply 51 is configured to apply a voltage to the ink-jet head 4 to thereby generate a potential difference between the ink-jet head 4 and the electrode 26. The power supply 51 performs switching between whether to perform voltage boosting of increasing the voltage which is to be output and whether to stop the voltage boosting so as to adjust the voltage to be output, as will be described later on. The operation of the power supply 51 will be explained in detail later on.

Further, the power supply 51 has a comparison signal receiving part 51*a*, a permission signal receiving part 51*b*, and an ON-OFF signal receiving part 51*c*.

The comparison signal receiving part 51*a* is a part configured to receive a comparison signal Scom output from the comparator 55, as will be described later on. The permission signal receiving part 51*b* is a part configured to receive a permission signal Sp output from the controller 30. The permission signal Sp is a signal indicating whether performing of the voltage boosting in the power supply 51 is permitted or not. The ON-OFF signal receiving part 51*c* is a part configured to receive an ON-OFF signal So output from the controller 30. The ON-OFF signal So is a signal indicating to make the power supply 51 to be in either one of an ON state in which the voltage boosting is allowed to be performed and an OFF state in which the voltage boosting is not allowed to be performed.

The main circuit 52 is a circuit connecting the power supply 51 and the ink-jet head 4. A low-pass filter 71 is connected to a part, of the main circuit 52, which is located between the power supply 51 and the ink-jet head 4. The low-pass filter 71 is a filter configured to reduce a component having a frequency higher than a cutoff frequency in the voltage variation in a part, of the main circuit 52, which is on a side of (closer to) the ink-jet head 4 and which is at the downstream side in supply of the voltage with respect to the low-pass filter 71, with respect to another part, of the main circuit 52, which is on a side of (closer to) the power supply 51 and which is at the upstream side in the supply of the voltage with respect to the low-pass filter 71. Namely, a DC component of the voltage inputted from the downstream side in the supply of the voltage with respect to the low-pass filter 71 is mainly output, from the low path filer 71, to the upstream side in the supply of the voltage.

The voltage dividing circuit 53 is connected to a connecting part 52*a*, of the main circuit 52, which is located between the power supply 51 and the low-pass filter 71. The voltage dividing circuit 53 is configured to output a voltage Vd which is obtained by dividing a voltage V output from the power supply 51 by a predetermined ratio. The voltage Vd output from the voltage dividing circuit 53 is a voltage having a magnitude which can be inputted to the comparator 55.

The comparison voltage generating circuit 54 is configured to generate a comparison voltage Vda to be compared with the voltage Vd output from the voltage dividing circuit 53. The comparison voltage Vda is a voltage corresponding to a predetermined voltage Va. More specifically, a magnitude |Vda| of the comparison voltage Vda is a magnitude |Vd| of the voltage Vd output from the voltage dividing circuit 53 in a case that a magnitude |V| of the voltage V output from the power supply 51 is a magnitude |Va| of the predetermined voltage Va. In other words, the magnitude |Vda| of the comparison voltage Vda is set so that magnitude |V| of the voltage V to be output from the power supply 51 is made to be the predetermined voltage Va. The comparison voltage generating circuit 54 has a PWM signal receiving part 54*a* configured to receive a PWM (Pulse Width Modulation) signal output from the controller 30. The comparison signal Scom generating circuit 54 is configured to generate the comparison voltage based on the PWM signal Spwm received by the PWM signal receiving part 54*a*. Specifically, the comparison signal generating circuit 54 is configured to generate the comparison voltage Vda of which magnitude is greater as a rate R by which the value in the PWM signal Spwm becomes to be High is higher.

The comparator 55 is electrically connected to the voltage dividing circuit 53, the comparison voltage generating circuit 54 and the power supply 51. The comparator 55 is configured to compare the magnitude of an absolute value |Vd| of the voltage Vd output from the voltage dividing circuit 53 with the magnitude of an absolute value |Vda| of the comparison voltage Vda output from the comparison voltage generating circuit 54, and to output the comparison signal Scom in accordance with a result of the comparison to the power supply 51. Namely, the comparison signal Scom is a signal indicating whether or not the magnitude of the absolute value |Vd| of the voltage Vd output from the voltage dividing circuit 53 is greater than the magnitude of the absolute value |Vda| of the comparison voltage Vda output from the comparison voltage generating circuit 54. The comparison signal Scom output from the comparator 55 is received by the comparison signal receiving part 51*a* of the power supply 51. Note that the magnitude of the absolute value |Vd| of the voltage Vd is simply referred to as the magnitude |Vd| of the voltage Vd. This is similarly applied with respect to another voltage or other voltages (for example, the comparison voltage Vda), as well.

Here, an operation of the power supply 51 will be explained. The power supply 51 is configured to perform the switching between whether to perform the voltage boosting and whether to stop the voltage boosting based on the comparison signal Scom in a case that the permission signal Sp received by the permission signal receiving part 51*b* indicates that the performing of the voltage boosting is permitted, and that the ON-OFF signal So received by the ON-OFF signal receiving part 51*c* indicates that the power supply 51 is to be in the ON state. Specifically, the power supply 51 performs the voltage boosting in a case that the comparison signal Scom indicates that the magnitude |Vd| is not more than the magnitude |Vda|. On the other hand, the power supply 51 stops the voltage boosting in a case that the comparison signal Scom indicates that the magnitude |Vd| is greater than the magnitude |Vda|. With this, the magnitude |Vd| of the voltage Vd output from the voltage dividing circuit 53 is maintained to be the voltage |Vda| of the comparison voltage Vda. Further, the magnitude |V| of the voltage V output from the power supply 51 is maintained to be the magnitude |Va| of the predetermined voltage Va.

Here, the predetermined voltage Va is, for example, a positive voltage of approximately 500V; and the comparison voltage Vda is, for example, a positive voltage of approximately 1.7 V. In this case, each of the voltage V and the voltage Vd becomes to be a voltage of not less than 0 (zero) V. Alternatively, the predetermined voltage Va may be, for example, a negative voltage of approximately −500V; and the comparison voltage Vda may be, for example, a negative voltage of approximately −1.7 V. In this case, each of the voltage V and the voltage Vd becomes to be a voltage of not more than 0 (zero) V.

The high-pass filter 56 is connected to a connecting part 52*b* (an example of a "second connecting part" of the present disclosure), of the main circuit 52, which is located between the ink-jet head 4 and the low-pass filter 71. The first output unit 58 is connected to the amplifier circuit 57. Namely, the amplifier circuit 57 is connected to a location between the high-pass filter 56 and the first output unit 58. Further, the high-pass filter 56 is consequently connected to a location between the power supply 51 and the first output unit 58.

In a case that any voltage variation occurs in the ink-jet head 4 which is at the upstream side in the supply of the voltage with respect to the high-pass filter 56, the DC component in the voltage (a high voltage component applied by the power supply 51) is removed by the high-pass filter 56, at the downstream side in the supply of the voltage with respect to the high-pass filter 56. The voltage which has passed through the high-pass filter 56 is amplified by the amplifier circuit 57, and is output from the first output unit 58. With this, the signal output from the first output unit 58 is a signal in which the high frequency component of the voltage of the ink-jet head 4 is amplified.

Here, an explanation will be given about the voltage of the ink-jet head 4 in a case that the inspection driving for causing the ink-jet head 4 to discharge the ink(s) from the nozzles 10 in a state that the above-described cap state is provided and that the voltage is applied by the voltage applying circuit 51 to the ink-jet head 4 so as to generate a voltage difference between the ink-jet head 4 and the electrode 26. In a case that the ink(s) is (are) not discharged from the nozzles 10 by the inspection driving, the voltage of the ink-jet head 4 hardly changes. In a case that the ink(s) is (are) discharged from the nozzles 10 by the inspection driving, the voltage of the ink-jet head 4 changes. Further, the change in the voltage of the ink-jet head 4 in the latter case becomes to be abrupt. Accordingly, the high frequency component of the voltage of the ink-jet head 4 is different depending on whether or not the ink(s) is (are) discharged from the nozzles 10 by the inspection driving.

With this, in a case that the ink(s) is (are) not discharged from the nozzles 10 by the inspection driving, each of the signal output from the high-pass filter 56 toward the amplifier circuit 57 and the signal output from the first output unit 58 becomes to be a signal of which voltage hardly changes from a voltage V0, as depicted in FIG. 5A. Here, the voltage V0 is, for example, a voltage close to the ground voltage.

On the other hand, in a case that the ink(s) is (are) discharged from the nozzles 10 by the inspection driving and that the voltage of the ink-jet head 4 changes, the signal output from the high-pass filter 56 toward the amplifier circuit 57 becomes to be a signal of which voltage changes with respect to the voltage V0, as depicted in FIG. 5B. Note that, however, an amount of change in the voltage (voltage change amount) of the voltage of the ink-jet head 4 in the case that the ink(s) is (are) discharged from the nozzles 10 by the inspection driving is smaller than a voltage change amount of the voltage of the ink-jet head 4 in a case that a temporary short circuit occurs between the ink-jet head 4 and the electrode 26 as will be descried later on. Accordingly, the signal output from the high-pass filter 56 toward the amplifier circuit 57 in the case that the ink(s) is (are) discharged from the nozzles 10 by the inspection driving also becomes to be a signal of which voltage change amount is small, as depicted in FIG. 5B.

Further, the signal output from the first output unit 58 is a signal obtained by amplifying the signal of FIG. 5B, as depicted in FIG. 5C. Accordingly, the signal output from the first output unit 58 is a signal in which the change in the voltage is greater than that in the signal output from the high-pass filter 56 toward the amplifier circuit 57. Specifically, the signal output from the first output unit 58 in a case that the ink(s) is (are) discharged from the nozzles 10 by the inspection driving is such a signal wherein a maximum value Vh of a voltage V1 is greater than Vh1 (Vh1>V0) and a minimum value Vm of the voltage V1 is smaller than Vm1 (Vm1<V0).

In such a manner, the signal output from the first output unit 58 is the signal indicating whether or not the ink(s) is (are) discharged from the nozzles 10 by the inspection driving. Further, since the signal output from the first output unit 58 is the signal amplified by the amplifier circuit 57, this signal becomes to be a signal in which the voltage change amount in the case that the ink(s) is (are) discharged from the nozzles 10 by the inspection driving is great to some extent.

The low-pass filter 59 is connected to a connecting part 52*c* (an example of a "first connecting part" of the present disclosure) which is located between the power supply 51 and the low-pass filter 71. Here, the connecting part 52*c* is also a part, in the main circuit 52, which is located between the power supply 51 and the ink-jet head 4. The second output unit 60 is connected to the low-pass filter 59. With this, in the present embodiment, there is provided such a configuration that the second output unit 60 is connected to the connecting part 52*c*, and that the low-pass filter 59 is connected between the connecting part 52*c* and the second output unit 60.

A second signal S2 output from the second output unit 60 becomes to be a signal in which the high frequency component is removed, with respect to the variation in the voltage in the ink-jet head 4, by the low-pass filters 59 and 71. Namely, the second signal S2 output from the second output unit 60 is consequently a signal of a DC component of the voltage of the ink-jet head 4.

Here, there is such a case, for example, that a continuous short circuit occurs between the ink-jet head 4 and the electrode 26 by a connection between the ink-jet head 4 and the electrode 26 via the ink inside the cap 21, in some cases. The phrase that the "continuous short circuit occurs between the ink-jet head 4 and the electrode 26" is that a state that the ink-jet head 4 and the electrode 29 are short circuited is continued, and that a leakage current continues to flow between the ink-jet head 4 and the electrode 26. In a case that the continuous short circuit occurs between the ink-jet head 4 and the electrode 26, the magnitude of the voltage of the ink-jet head 4 becomes to be small due to the leakage current which is continuously flowing between the ink-jet head 4 and the electrode 26.

Accordingly, as depicted in FIG. 6, in a case that any continuous short circuit does not occur between the ink-jet head 4 and the electrode 26, a magnitude |V2| of the second signal S2 output from the second output unit 60 becomes to be approximately a voltage V2*a* (V2*a*>0 (zero)). In the state that a continuous short circuit occurs between the ink-jet head 4 and the electrode 26, the magnitude |V2| of the second signal S2 output from the second output unit 60 becomes to be smaller than a voltage V2*b* (V2*b*<V2*a*). With this, the second signal S2 becomes to be a signal indicating as to whether or not the continuous short circuit occurs between the ink-jet head 4 and the electrode 26. Note that FIG. 6 indicates such a situation that the continuous short circuit does not occur between the ink-jet head 4 and the electrode 26 until a time T1, and that the continuous short circuit occurs between the ink-jet head 4 and the electrode 26 at (after) the time T1.

The latched circuit 61 is connected to the high path filer 56, in parallel with the amplifier circuit 57. The third outputting circuit 62 is connected to the latched circuit 61. With this, there is provided such a configuration that the third output unit 62 is connected to the high-pass filter 56 not via the amplifier circuit 57 and that the latched circuit 61 is connected between the high-pass filter 56 and the third output unit 62. The latched circuit 61 receives, from the voltage of the ink-jet head 4, a signal from which the DC component (the high voltage component applied by the power supply 51) is removed by the high-pass filter 56. The latched circuit 61 is configured to output a signal in a case that a voltage which is not less than the predetermined voltage is inputted to the latched circuit 61, and not to output the signal in a case that a voltage less than the predetermined voltage is inputted to the latched circuit 61. Further, the latched circuit 61 has a circuit which is configured, in a case that the circuit outputs a signal once, to maintains the output of the signal. The latched circuit 61 is provided with a cancellation signal receiving part 61*a* configured to receive, from the controller 30, a cancelling signal Sc instructing cancellation of the output of the signal from the latched circuit 61; the maintenance of the output of the signal from the latched circuit 61 is continued until a cancellation instruction such as the cancellation signa from the controller 30 is received by the cancellation signal receiving part 61*a*.

Here, for example, in a case that a temporary short circuit occurs between the ink-jet head 4 and the electrode 26 due to a temporary electric discharge generated in a gap between the ink inside the cap 21 and the nozzle surface 4*a*, a temporary change in the voltage occurs in the ink-jet head 4. The phrase that the "temporary short circuit occurs between the ink-jet head 4 and the electrode 26" means that the ink-jet head 4 and the electrode 26 are temporarily short circuited, and the leakage current temporarily flows between the ink-jet head 4 and the electrode 26. Further, the temporary change in the voltage in the ink-jet head 4 in the case that the temporary short circuit occurs between the ink-jet head 4 and the electrode 26 is abrupt. Accordingly, the high frequency component is different depending on whether or not the temporary short circuit occurs between the ink-jet head 4 and the electrode 26. Furthermore, a voltage change amount in the ink-jet head 4 in the above-described situation is greater than a voltage change amount in the ink-jet head 4 in a case that the ink is discharged from the nozzles 10 by the inspection driving.

Accordingly, in the case that the temporary short circuit does not occur between the ink-jet head 4 and the electrode 26, the voltage hardly changes in the signal output from the high-pass filter 56 and received by the latched circuit 61, as depicted in FIG. 7A. Namely, the latched circuit 61 does not output the signal. On the other hand, in the case that the temporary short circuit occurs between the ink-jet head 4 and the electrode 26, the voltage changes temporarily in the signal output from the high-pass filter 56 and received by the latched circuit 61, as depicted in FIG. 7B. Note, however, that this change in the voltage is of a short period of time.

Further, in a case that a change in the voltage occurs in the signal received by the latched circuit 61 due to a temporary short circuit occurring between the ink-jet head 4 and the electrode 26, the latched circuit 61 outputs the signal. Furthermore, since the latched circuit 61 has the circuit which is configured to maintain the output of the signal, the output of the signal is continued. With this, a latched signal Sl output by the latched circuit 61 is a signal of which voltage is V0 in a case that any temporary short circuit does not occur between the ink-jet head 4 and the electrode 26, and of which voltage is V3*a* (V3*a*>V0) in a case that any temporary short circuit occurs between the ink-jet head 4 and the electrode 26, as depicted for example in FIG. 7C, and the output of the signal is maintained. Namely, the latched signal Sl output from the latched circuit 61 is a signal indicating as to whether or not the temporary short circuit occurs between the ink-jet head 4 and the electrode 26. Note that FIGS. 7B and 7C indicates a case wherein the temporary short circuit occurs between the ink-jet head 4 and the electrode 26 at a time T2. Further, in a case that the temporary short circuit successively occurs between the ink-jet head 4 and the electrode 26, the latched signal Sl output from the latched circuit 61 is such a signal that a state that the voltage is V3 is continued. In a case that the controller 30 determines that there is no need to maintain the output from the latched circuit 61, the controller 30 outputs the cancellation signal; the latched circuit 61 receives, at the cancellation signal receiving part 61*a*, the cancellation signal from the controller 30. The latched circuit 61 stops the output of the latched signal Sl in response to the receipt of the cancellation signal. Note that FIG. 7C indicates a case that the latched circuit 61 receives the cancellation signal at a time T3 which is later than the time T2. Further, the third signal S3 output from the third output unit 62 which is connected to the latched circuit 61 is a signal same as the latched signal.

The electric discharging circuit 63 is connected to a connecting part 52*d* (an example of a "third connecting part" of the present disclosure) which is between the ink-jet head 4 and the connecting part 52*a*. The connecting part 52*d* is also a part, of the main circuit 52, which is located between the ink-jet head 4 and the low-pass filter 71. Further, the connecting part 52*d* is closer to the ink-jet head 4 than the connecting part 52*c*, of the main circuit 52, to which the second output unit 60 is connected and the connecting part 52*b*, of the main circuit 52, to which the third output unit 62 is connected. The electric discharging circuit 63 is configured to perform electric discharge at a position close to the ink-jet head 4 so as to lower the voltage of the ink-jet head 4 quickly, without waiting the voltage supplied from the power supply 51 to be lowered.

The electric discharging circuit 63 has a second signal receiving part 63*a* configured to receive the second signal S2 output from the second output unit 60 and a latched signal receiving part 63*b* configured to receive the signal output from the latched circuit 61. The second signal receiving part 63*a* is electrically connected to the second output unit 60. The latched signal receiving part 63*b* is electrically connected to the latched circuit 61. The electric discharging circuit 63 discharges the electricity (performs an electric discharge) from the ink-jet head 4 in a case that the second signal S2 received at the second signal receiving part 63*a* indicates that the continuous short circuit occurs between the ink-jet head 4 and the electrode 26. Further, the electric discharging circuit 63 performs the electric discharge from the ink-jet head 4 in a case that the latched signal Sl received at the latched signal receiving part 63*b* indicates that the temporary short circuit occurs between the ink-jet head 4 and the electrode 26.

<Processing at a Time of Receiving Inspection Instruction Signal>

Next, an explanation will be given about the flow of a processing by the controller 30 in a case that the controller 30 receives an inspection instruction signal of instructing to perform an inspection as to whether or not the ink(s) is (are) discharged from the nozzles 10. In the present embodiment, in a case that, for example, the user operates a non-illustrated operating part of the printer 1, a PC connected to the printer 1, etc., so as to instruct to perform an inspection as to whether the ink(s) is (are) normally discharged from the nozzles 10, the inspection instruction signal is transmitted from the operating part of the printer 1, the PC, etc., and the controller 30 receives the inspection instruction signal. Further, in a case that the controller 30 receives the inspection instruction signal, the controller 30 performs the processing along a flow as depicted in FIGS. 8A and 8B.

Note that at a point of time when the flow of FIG. 8A is started, the ON-OFF signal So which is output from the controller 30 indicates that the power supply 51 is to be switched OFF. Further, the permission signal Sp which is output from the controller 30 is a signal indicating that the voltage boosting in the power supply 51 is not to be permitted. Furthermore, at this point of time, the controller 30 has not output the PWM signal Spwm.

To provide a more detailed explanation about the flow of FIGS. 8A and 8B, the controller 30 first executes a capping processing (step S101). In the capping processing, the controller 30 controls the carriage motor 36 and the cap lifting-lowering mechanism 38 to thereby provide the above-described cap state. In a case that the cap state is provided at the time of receiving the inspection instruction signal, the controller 30 maintains the cap state in step S101.

Next, the controller 30 switches the ON-OFF signal So which is being output thereby into a signal of turning the power supply 30 to be in the ON state (step S102). Subsequently, the controller 30 switches the permission signal Sp which is being output thereby into a signal of permitting the voltage boosting (step S103). Subsequently, the controller 30 starts the output of the PWM signal Spwm (step S104). By the processings of steps S102 to S104, the power supply 51 performs the switching between the performing of the voltage boosting and the stopping of the voltage boosting, based on the comparison signal Scom, as described above.

With this, the voltage boosting is performed in the power supply 51 until the magnitude |Vd| of the voltage Vd output from the voltage dividing circuit 53 becomes to be the magnitude |Vda| of the comparison voltage Vda, namely, until the magnitude |V| of the voltage V output from the power supply 51 becomes to be the magnitude |Va| of the predetermined voltage Va. Further, the comparison signal Scom in response to a situation that the magnitude |Vd| of the voltage Vd output from the voltage dividing circuit 53 reaches the magnitude |Vda| of the comparison voltage Vda is received by the comparison signal receiving part 51*a*, and the voltage boosting is stopped in the power supply 51. In such a manner, the power supply 51 repeats the voltage boosting and the stopping of the voltage boosting based on the comparison signal Scom so that the magnitude |Vd| of the voltage Vd output from the voltage dividing circuit 53 is maintained to be the magnitude |Vda| of the comparison voltage Vda. Namely, the magnitude |V| of the voltage V output from the power supply 51 is maintained to be the magnitude |Va| of the predetermined voltage Va.

Subsequently, the controller 30 starts a discharge detecting processing after the voltage supplied to the ink-jet head 4 becomes to be the predetermined voltage Va (step S105).

In the discharge detecting processing, the controller 30 causes the inspection driving to be performed, in succession, with respect to each of the plurality of nozzles 10 of the ink-jet head 4. Further, the controller 30 determines as to whether or not the ink is discharged normally from each of the plurality of nozzles 10, based on the first signal S1 output from the first output unit 58 in the case that the inspection driving is performed, and the controller 30 causes the memory 34 to store a result of the determination.

In a case that the continuous short circuit does not occur between the ink-jet head 4 and the electrode 26 (step S106: NO) and that the temporary short circuit does not occur between the ink-jet head 4 and the electrode 26 (step S107: NO), the controller 30 continues to perform the discharge detecting processing until the discharge detecting processing is completed (step S108: NO). Here, in step S106, the controller 30 determines whether or not the continuous short circuit occurs between the ink-jet head 4 and the electrode 26 based on the second signal S2 output from the second output unit 60. Further, in step S107, the controller 30 determines whether or not the temporary short circuit occurs between the ink-jet head 4 and the electrode 26 based on the third signal S3 output from the third output unit 62.

In a case that the discharge detecting processing is completed (step S108: YES), the controller 30 stops the output of the PWM signal Spwm (step S109). With this, the magnitude |Vd| of the comparison voltage Vd becomes to be small (for example, becomes to be the ground voltage). As a result, the voltage boosting is not performed (is stopped) in the power supply 51, and the magnitude |Va| of the voltage V output from the power supply 51 becomes to be small gradually, and finally becomes to be, for example, the ground voltage. Namely, the output of the voltage from the power supply 51 is stopped.

Next, the controller 30 switches the permission signal Sp which is output thereby to a signal indicating that the voltage boosting is not permitted (step S110). Subsequently, the controller 30 switches the ON-OFF signal So which is output thereby to a signal indicating that the power supply 51 is made to be in the OFF state (step S111).

On the other hand, in a case that the continuous short circuit occurs between the ink-jet head 4 and the electrode 26 during the discharge inspecting processing (step S106: YES), and in a case that the temporary short circuit occurs between the ink-jet head 4 and the electrode 26 during the discharge inspecting processing (step S107: YES), the controller 30 suspends (temporary stops) the discharge detecting processing (step S112), executes an uncapping processing (step S113), and then executes the processings of steps S109 to S111. In the uncapping processing of step S113, the controller 30 controls the cap lifting-lowering mechanism 38 so as to lower the cap 21, thereby providing the uncap state. With this, the leakage current is less likely to flow between the ink-jet head 4 and the electrode 26, thereby preventing the nozzle(s) 10 from being damaged.

Further, in a case that the continuous short circuit occurs between the ink-jet head 4 and the electrode 26 during the discharge inspecting processing, the second signal S2 received by the second signal receiving part 63*a* of the electric discharging circuit 63 becomes to be the signal indicating that the continuous short circuit occurs between the ink-jet head 4 and the electrode 26. Due to this, the electric discharging circuit 63 performs the electrical discharge from the ink-jet head 4. On the other hand, in a case that the temporary short circuit occurs between the ink-jet head 4 and the electrode 26 during the discharge inspecting processing, the latched signal Sl received by the latched signal receiving part 63*b* of the electric discharging circuit 63 becomes to be the signal indicating that the temporary short circuit occurs between the ink-jet head 4 and the electrode 26. Due to this, the electric discharging circuit 63 performs the electric discharge from the ink-jet head 4. In a state that the electric discharging circuit 63 performs the electric discharge from the ink-jet head 4, the leak current is less likely to flow between the ink-jet head 4 and the electrode 26, thereby preventing the nozzle(s) 10 from being damaged.

Furthermore, in a case that the discharge inspecting processing is not suspended (not temporarily stopped) after the processing of step S111, namely, in a case that the discharge inspecting processing is completed (step S114: NO), the controller 30 ends the processing as it is. In a case that the discharge inspecting processing is suspended (temporarily stopped) (step S114: YES), the controller 30 executes an idle suction processing (step S115), and returns to step S101. In the idle suction processing, the controller 30 drives the suction pump 22 in the uncap state to thereby perform the idle suction. Note that in the discharge inspecting processing which is started in step S105, after the idle suction processing in step S114, it is allowable to determine whether or not the ink(s) is (are) discharged normally only with respect to a nozzle(s) 10, included in the plurality of nozzles 10 and different from nozzles which are included in the plurality of nozzles 10 and regarding which the determination as to whether or not the ink(s) is (are) discharged normally has been determined before the discharge inspecting processing is temporary suspended; it is also allowable to determine whether or not the ink(s) is (are) discharged normally with respect to all of the plurality of nozzles 10.

Technical Effect of Embodiment

According to the present embodiment, it is possible to determine as to whether or not the liquid is normally discharged from the nozzles 10 based on the first signal S1 output from the first output unit 58 in the case that the inspection driving is performed.

Further, in the case that the continuous short circuit occurs between the ink-jet head 4 and the electrode 26, the DC component of the voltage of the ink-jet head 4 is changed. In the present embodiment, since the second output unit 60 is connected to the ink-jet head 4 via the low-pass filters 59 and 71, the second signal S2 output from the second output unit 60 becomes to be the signal including the DC component with respect to the voltage variation of the ink-jet head 4. With this, it is possible to detect, based on the second signal, more precisely that the continuous short circuit occurs between the ink-jet head 4 and the electrode 26.

Furthermore, in the case that the temporary short circuit occurs between the ink-jet head 4 and the electrode 26, the voltage of the ink-jet head 4 changes abruptly, which in turn generates a high frequency component in the voltage of the ink-jet head 4. In the present embodiment, since the third output unit 62 is connected to the ink-jet head 4 via the high-pass filter 56, the third signal S3 output from the third output unit 62 becomes to be a signal including the high frequency component with respect to the voltage variation in the ink-jet head 4. With this, it is possible to detect, based on the third signal S3, that the temporary short circuit occurs between the ink-jet head 4 and the electrode 26.

Moreover, in the present embodiment, the low-pass filter 71 having an effect in a direction from the ink-jet head 4 toward the power supply 51 is connected between the power supply 51 and the ink-jet head 4. Accordingly, even in a case that any fluctuation or variation of the voltage occurs in the ink-jet head 4 due to the temporary short circuit or the discharge, this fluctuation in the voltage is less likely to be transmitted to the power supply 51. With this, it is possible to suppress the fluctuation in the voltage Vd output from the voltage dividing circuit 53, thereby stabilizing the voltage V supplied from the power supply 51.

Further, in the present embodiment, the low-pass filter 71 and the low-pass filter 59 are connected between the ink-jet head 4 and the second output unit 60. With this, it is possible to effectively remove the high frequency component of the voltage of the ink-jet head 4 by these two low-pass filters 59 and 71.

Furthermore, in the present embodiment, the third output unit 62 is electrically connected to the connecting part 52*b*, of the main circuit 52, which is located between the ink-jet head 4 and the low-pass filter 71; and the high-pass filter 56 is connected between the third output unit 62 and the connecting part 52*b*. With this, it is possible to provide such a configuration that the high-pass filter 56 is connected between the ink-jet head 4 and the third output unit 62.

Moreover, by connecting the third output unit 62 and the high-pass filter 56 in such a manner, it is possible to connect the ink-jet head 4 and the third output unit 62, not via the low-pass filter 71. With this, it is possible to precisely detect, based on the third signal S3 output from the third output unit 62, whether or not the temporary short circuit occurs between the ink-jet head 4 and the electrode 26.

Further, in the case that the temporary short circuit occurs between the ink-jet head 4 and the electrode 26, the voltage of the ink-jet head 4 changes only for a short period of time. Accordingly, in a presumed case, unlike the present embodiment, that the latched circuit 61 is not connected between the high-pass filter 56 and the third output unit 62, and that the temporary short circuit occurs between the ink-jet head 4 and the electrode 26, then the third signal S3 output from the third outputting art 62 also becomes to be a signal in which the voltage changes only for a short period of time. As a result, there arises such a fear that, in the controller 30, it might not be possible to determine, based on the third signal S3, that the temporary short circuit occurs between the ink-jet head 4 and the electrode 26.

In contrast, in the present embodiment, the latched circuit 61 is connected between the high-pass filter 56 and the third output unit 62. Accordingly, in a case that the temporary short circuit occurs between the ink-jet head 4 and the electrode 26 and that a change occurs in the voltage of the ink-jet head 4 for a short period of time, information indicating that such a voltage change occurred for a short period of time is retained in the latched circuit 61. Further, the third signal S3 output from the third output unit 62 becomes to be a signal in accordance with the information retained in the latched circuit 61. With this, it is possible to detect, in the controller 30, based on the third signal S3, precisely that the temporary short circuit occurs between the ink-jet head 4 and the electrode 26.

Furthermore, in the case that the temporary short circuit occurs between the ink-jet head 4 and the electrode 26, unless the state of the ink(s) between the electrode 26 and the ink-jet head 4 does not change, there is a high possibility that the temporary short circuit might occur again. In such a situation, owing to the presence of the latched circuit 61 capable of maintaining the output of the latched signal Sl even after the temporary short circuit has occurred, it is possible to continuously maintain the output of the latched signal Sl during a period of time until the state of the ink(s) between the electrode 26 and the ink-jet head 4 is improved. Accordingly, it is possible to prevent reoccurrence of the temporary short circuit.

Moreover, in the present embodiment, in order to cause a voltage change, having a magnitude of such an extent that is detectable, to occur in the ink-jet head 4 in a case that the ink(s) is (are) discharged from the nozzles 10 toward the electrode 26 by the inspection driving, it is necessary to make the voltage difference, made to occur between the ink-jet head 4 and the electrode 26 by the power supply 51, to be great. Due to this, the DC component of the voltage output from the ink-jet head 4 becomes to be, for example, a high voltage of approximately 500V. On the other hand, a voltage change amount of the ink-jet head 4 in the case that the ink(s) is (are) discharged from the nozzles 10 by the inspection driving is small, as compared with the magnitude of the DC component of the voltage of the ink-jet head 4.

In the present embodiment, since the high-pass filter 56 is connected between the ink-jet head 4 and the first output unit 58, a signal from which the DC component (a component of the high voltage) has been removed from the voltage of the ink-jet head 4 is consequently transmitted toward the first output unit 58. Accordingly, the first signal S1 output from the first output unit 58 becomes to be a signal by which it is easily grasp whether or not the ink is normally discharged from the nozzles 10 by the inspection driving. Further, since the first output unit 58 and the third output unit 62 are connected to the high-pass filter 56 which is common to the first output unit 58 and the third output unit 62, it is possible to simplify the circuit configuration of the inspection circuit 27.

Further, in the present embodiment, the voltage change amount of the ink-jet head 4 in the case that the ink(s) is (are) discharged from the nozzles 10 toward the electrode 26 by the inspection driving is smaller than the voltage change amount of the ink-jet head 4 in a case that the temporary short circuit occurs between the ink-jet head 4 and the electrode 26.

In view of this, in the present embodiment, the amplifier circuit 57 is provided between the high-pass filter 56 and the first output unit 58. With this, in the case that the ink(s) is (are) discharged from the nozzles 10 toward the electrode 26 by the inspection driving, the magnitude of the voltage of the first signal S1 output from the first output unit 58 does not become to be too small, thereby making it possible to detect, based on the first signal S1 and with a high precision, as to whether or not the ink(s) is (are) discharged normally from the nozzles 10 toward the electrode 26 by the inspection driving.

On the other hand, the third output unit 62 is connected to the high-pass filter 56, not via the amplifier circuit 57. With this, it is possible to make the magnitude of the voltage of the third signal S3 output from the third output unit 62 not to be too great.

Further, in the present embodiment, in a case that the temporary short circuit or the continuous short circuit occurs between the ink-jet head 4 and the electrode 26, the electric discharging circuit 63 performs the electric discharge from the ink-jet head 4. With this, it is possible to suppress the leakage current flowing between the ink-jet head 4 and the electrode 26, and to prevent the nozzles 10 from being damaged due to the leakage current. Furthermore, since the electric discharging circuit 63 is connected to the connecting part 52*d*, of the main circuit 52, which is located between the ink-jet head 4 and the low-pass filter 71 and which is near to the ink-jet head 4, it is possible to perform the electric discharge as quickly as possible from the ink-jet head 4 in the case that the temporary short circuit or the continuous short circuit occurs between the ink-jet head 4 and the electrode 26.

Moreover, the connecting part 52*d* to which the electric discharging circuit 63 is connected is a part, of the main circuit 52, closer to the ink-jet head 4 than the connecting part 52*c*, of the main circuit 52, to which the second output unit 60 is connected and closer to the ink-jet head 4 than the connecting part 52*b*, of the main circuit 52, to which the third outputting circuit 62 is connected. From this point of view, it is possible to perform the electric discharge as quickly as possible from the ink-jet head 4 in the case that the temporary short circuit or the continuous short circuit occurs between the ink-jet head 4 and the electrode 26.

Further, in the present embodiment, the latched circuit 61 and the electric discharging circuit 63 are electrically connected, and the electric discharging circuit 63 performs switching between whether to performing the electric discharge from the ink-jet head 4 or not to perform the electric discharge from the ink-jet head 4, based on the latched signal Sl output from the latched circuit 61. With this, in the case that the temporary short circuit occurs between the ink-jet head 4 and the electrode 26, it is possible to perform the electric discharge from the ink-jet head 4 as quickly as possible, based on the latched signal Sl output from the latched circuit 61. Furthermore, in the case that the temporary short circuit occurs between the ink-jet head 4 and the electrode 26, there is a high possibility that such a temporary short circuit might occur again. In the present embodiment, the latched signal Sl output from the latched circuit 61 is inputted directly into the electric discharging circuit 63, thereby making is possible continue the electric discharge from the ink-jet head 4 until the voltage variation (voltage fluctuation) of the voltage of the ink-jet head 4 due to the above-described temporary short circuit is dissolved.

Moreover, in the present embodiment, the second output unit 60 and the electric discharging circuit 63 are electrically connected; the electric discharging circuit 63 performs switching between whether to perform the electric discharge from the ink-jet head 4 or not to perform the electric discharge from the ink-jet head 4, based on the second signal S2 output from the second output unit 60. With this, in the case that the temporary short circuit occurs between the ink-jet head 4 and the electrode 26, it is possible to perform the electric discharge as quickly as possible from the ink-jet head 4, based on the second signal S2 output from the second output unit 60, in the case that the continuous short circuit occurs between the ink-jet head 4 and the electrode 26.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Modifications

In the foregoing, the embodiment of the present disclosure has been explained. The present disclosure, however, is not limited to or restricted by the above-described embodiment; a various kinds of change can be made to the present disclosure within the range described in the claims.

In the above-described embodiment, the second signal receiving part 63*a* of the electric discharging part 63 and the second output unit 60 are electrically connected, and the latched signal receiving part 63*b* of the electric discharging part 63 and the latched circuit 61 are electrically connected. Further, in a case that the second signal S2 received by the second signal receiving part 63*a* is the signal indicating that the continuous short circuit occurs, and that the latched signal Sl received by the latched signal receiving part 63*b* of the electric discharging circuit 63 is the signal indicating that the temporary short circuit occurs, the electric discharging circuit 63 is configured to perform the electric discharge from the ink-jet head 4. The present disclosure, however, is not limited to or restricted by this.

In a first modification, as depicted in FIG. 9, the controller 30 is configured to be capable of outputting an electric discharge instruction signal Sd of instructing an electric discharging circuit 101 to perform an electric discharge from the ink-jet head 4. The electric discharging circuit 101 has an electric discharge instruction signal receiving part 101*a*. Further, the electric discharging circuit 101 is configured to perform the electric discharge from the ink-jet head 4 in a case that the electric discharge instruction signal Sd is received at the electric discharge instruction signal receiving part 101*a*. Namely, in the above-described embodiment, the electric discharging circuit 63 receives, not via the controller 30, the signals which are output, respectively, from the second output unit 60 and the latched circuit 61 and which are in accordance with the occurrence of the short circuit. In contrast, in the first modification, the controller 30 receives the signals which are output, respectively, from the second output unit 60 and the latched circuit 61 and which are in accordance with the occurrence of the short circuit; the controller 30 outputs the electric discharge instruction signal Sd of instructing the electric discharging circuit 101 to perform the electric discharge, based on these signals.

In the first modification, in a case that the controller 30 receives the inspection instruction signal, the controller 30 performs the processing along the flow chart of FIGS. 10A and 10B. To provide more detailed explanation, in the case that the controller 30 receives the inspection instruction signal, the controller 30 executes processings of steps S101 to S115 which are similar to those of the above-described embodiment. Note that, however, in the first modification, in a case that the controller 30 receives a signal which is in accordance with a situation that the short circuit occurs between the ink-jet head 4 and the electrode 26 in step S106 or in step S107, the controller 30 outputs the electric discharge instruction signal Sd to the electric discharge circuit 101 (step S201), and then the controller 30 proceeds to step S112, unlike the above-described embodiment.

In the first modification, in a case that the controller 30 determines that the continuous or temporary short circuit occurs between the ink-jet head 4 and the electrode 26, the controller 30 outputs the electric discharge instruction signal Sd to the electric discharging circuit 101. Further, in a case that the electric discharging circuit 101 receives the electric discharge instruction signal Sd at the electric discharge instruction signal receiving part 101*a*, the electric discharging circuit 101 performs the electric discharge from the ink-jet head 4. With this, in the case that the continuous or temporary short circuit occurs between the ink-jet head 4 and the electrode 26, it is possible to perform the electric discharge from the ink-jet head 4.

Further, it is allowable that the electric discharging circuit has both of the second signal receiving part 63*a* and the latched signal receiving part 63*b* in the above-described embodiment, and the electric discharge instruction signal receiving part 101*a* of the first modification. Furthermore, it is allowable to provide such a configuration wherein the electric discharging circuit 63 performs the electric discharge from the ink-jet head 4 in a case that the second signal S2 received by the second signal receiving part 63*a* is the signal indicating that the continuous short circuit occurs, that the latched signal Sl received by the latched signal receiving part 63*b* of the electric discharging circuit 63 is the signal indicating that the temporary short circuit occurs and that the electric discharge instruction signal Sd is received at the electric discharge instruction signal receiving part 101*a*. Moreover, the electric discharging circuit may be configured to have either one of the second signal receiving part 63*a* and the latched signal receiving part 63*b* of the above-described embodiment, and to have the electric discharge instruction signal receiving part 101*a* of the first modification.

Further, in the above-described embodiment, the electric discharging circuit 63 is connected to the connecting part 52*a*, of the main circuit 52, which is located between the ink-jet head 4 and the low-pass filter 71. Further, the connecting part 52*d* is the part which is closer to the ink-jet head 4 than the connecting part 52*c* to which the second output unit 60 is connected and the connecting part 52*b* to which the third output unit 62 is connected. The present disclosure, however, is not limited to this.

For example, it is allowable that the electric discharging circuit 63 is connected to a connection part, of the main circuit 52, which is located between the ink-jet head 4 and the low-pass filter 71 and which is a connecting part (an example of a "third connecting part" of the present disclosure) farther from the ink-jet head 4 than at least one of the connecting parts 52*b* and 52*c*.

Alternatively, for example, it is allowable that the electric discharging circuit 63 is connected to a part, of the main circuit 52, which is different from the part, of the main circuit 52, located between the ink-jet head 4 and the low-pass filter 71 and which is a connecting part (an example of the "third connecting part" of the present disclosure) closer to the ink-jet head 4 than the connecting parts 52*b* and 52*c*.

Still alternatively, for example, it is allowable that the electric discharging circuit 63 is connected to a part, of the main circuit 52, which is different from the part, of the main circuit 52, located between the ink-jet head 4 and the low-pass filter 71 and which is a connecting part (an example of the "third connecting part" of the present disclosure) farther from the ink-jet head 4 than at least one of the connecting parts 52*b* and 52*c*. Further, it is allowable that the electric discharging circuit 63 is connected to the ink-jet head 4 not via the main circuit 52. Furthermore, it is allowable that the discharging circuit configured to perform the electric discharge from the ink-jet head 4 is not provided.

Furthermore, in the above-described embodiment, the high-pass filter 56 and the first output unit 58 are connected via the amplifier circuit 57, and the high-pass filter 56 is connected to the third output unit 56 not via the amplifier circuit 57. The present disclosure, however, is not limited to this. For example, in a case that a small change in the voltage in the first output unit 58 can be detected in the controller 30, it is allowable that the amplifier circuit 57 is not connected between the high-pass filter 56 and the first output unit 58.

Moreover, in the above-described embodiment, although the high-pass filter 56 is connected between the first output unit 58 and the connecting part 52*b* to thereby connect the high-pass filter 56 to the first output unit 58 and the third connecting part 62, the present disclosure is not limited to this. For example, it is allowable that the ink-jet head 4 and the third output unit 62 are connected via the high-pass filter 56 and that the ink-jet head 4 and the first output unit 58 are connected not via the high-pass filter 56. In such a case, it is allowable that another high-pass filter which is different from the high-pass filter 56 is connected between the ink-jet head 4 and the first output unit 58. Namely, the high-pass filter connected between the ink-jet head 4 and the first output unit 58 and the high-pass filter connected between the ink-jet head 4 and the third output unit 62 may be mutually different. Alternatively, it is allowable that the high-pass filter is not connected between the ink-jet head 4 and the first output unit 58.

Further, in the above-described embodiment, although the latched circuit 61 is connected between the high-pass filter 56 and the third output unit 62, the present disclosure is not limited to this. For example, in a case that the electric discharging circuit 63 and the controller 30 are configured to precisely detect the voltage change which is for a short period time and which is received by the electric discharging circuit 63 and the controller 30, it is allowable that the latched circuit 61 is not connected between the high-pass filter 56 and the third output unit 62.

Furthermore, in the above-described embodiment, although the third output unit 62 is connected to the connecting part 52*b* of the main circuit 52 and the high-pass filter 56 is connected between the connecting part 52*b* and the third output unit 62, the present disclosure is not limited to this. For example, it is allowable that the ink-jet head 4 and the third output unit 62 are connected not via the main circuit 52, and that the high-pass filter 56 is connected between the ink-jet head 4 and the third output unit 62.

Moreover, in the above-described embodiment, although the low-pass filter 71 which is provided on the main circuit 52 and the low-pass filter 59 which is provided at the outside of the main circuit 52 are connected between the ink-jet head 4 and the second output unit 60, the present disclosure is not limited to this. For example, it is allowable that only the low-pass filter 71 provided on the main circuit 52 is connected between the ink-jet head 4 and the second output unit 60. Alternatively, it is allowable that only the low-pass filter 59 provided at the outside of the main circuit 52 is connected between the ink-jet head 4 and the second output unit 60.

Moreover, in the above-described embodiment, although the first output unit 58 is electrically connected to the electrode 26, the present disclosure is not limited to this. For example, in a second modification, as depicted in FIG. 11, a first output unit 111 is connected to the electrode 26, and an amplifier circuit 112 is connected between the first output unit 111 and the electrode 26. Further, the electrode 26 is connected to the ground. Note that although omitted in the drawings, in the second modification, the first output unit and the amplifier circuit are not connected to the ink-jet head 4.

In a case that the inspection driving is performed in a state that any voltage difference is generated between the ink-jet head 4 and the electrode 26, the voltage change occurs in each of the ink-jet head 4 and the electrode 26. Accordingly, also in a case that the first output unit 111 is connected to the electrode 26, it is possible to determine as to whether or not the ink(s) is (are) discharged normally from the nozzles 10, based on a first signal S1 output from the first output unit 111. Note that also in the second modification, it is allowable that the amplifier circuit 112 is not connected between the electrode 26 and the first output unit 111, similarly to the configuration as described above. Further, it is allowable that a filter is connected between the electrode 26 and the ground. This filter is provided, in the configuration wherein the first output unit 111 is connected to the electrode 26 with respect to the voltage supplied to the ink-jet head 4, in order that the amplitude of a signal which is output in accordance with the discharge of the ink by the inspection driving performed by the ink-jet head 4 is not made to be small; it is possible to make the signal output from the first output unit 111 to be greater by providing the filter.

Further, in the above-described embodiment, the comparison signal Scom is output from the comparison circuit 55 based on the magnitude relationship between the magnitude |Vd| of the voltage Vd output by the voltage dividing circuit 53 and the magnitude |Va| of the comparison voltage Va generated by the comparison voltage generating circuit 54. Furthermore, by switching between whether to perform voltage boosting in the power supply 51 or not to perform the voltage boosting based on the comparison signal Scom, the voltage is output from the power supply 51 and is applied to the ink-jet head 4. The present disclosure, however, is not limited to this. It is allowable to apply the voltage to the ink-jet head 4 by a voltage supplying part (power supply) having a configuration different from that described above.

Furthermore, in the above-described embodiment, although the determination as to whether the ink(s) is (are) discharged normally from the nozzles 10 is made by performing the inspection driving with respect to all the nozzles 10 of the ink-jet head 4, the present disclosure is not limited to this. For example, it is allowable to perform the inspection driving with respect only to a part of the nozzles 10 of the ink-jet head 4, for example, every other nozzle 10 in each of the nozzle rows 9, etc., so as to determine as to whether or not the ink(s) is (are) discharged normally from the nozzles 10. Further, it is allowable to presume, with respect to nozzles 10 which are different from the part of the nozzles 10 as to whether or not the ink(s) is (are) to be discharged normally from the nozzles 10, based on the result of determination regarding the above-described part of the nozzles 10.

Moreover, in the above-described embodiment, the first signal S1 output from the first output unit is the signal depending on whether or not the ink(s) is (are) discharged normally from the nozzles 10. Further, in a case that the first signal S1 indicates that the ink(s) is (are) discharged normally from the nozzles 10, it is determined that the ink(s) is (are) discharged normally from the nozzles 10. The present disclosure, however, is not limited to this. It is allowable, for example, that the first signal S1 is a signal in accordance with another discharging aspect which is different from whether or not the ink(s) is (are) discharged normally from the nozzles 10, such as a discharging direction, a discharging velocity, etc., of the ink. Further, it is allowable to determine that the ink(s) is (are) discharged normally from the nozzles 10 in a case that the first signal S1 indicates that the ink(s) is (are) discharged from the nozzles 10 in a predetermined discharging aspect.

Furthermore, in the foregoing description, although the explanation has been made regarding the example wherein the present disclosure is applied to a printer provided with a so-called serial head which discharges the ink from the plurality of nozzles while moving in the scanning direction together with the carriage, the present disclosure is not limited to this. The present disclosure is applicable, for example, also to a printer provided with a so-called line head which extends in the scanning direction over the entire length of a recoding paper sheet.

Moreover, in the foregoing description, although the explanation has been given about the example wherein the present disclosure is applied to the printer which discharges the ink from the nozzles so as to perform recording on the recording paper sheet P, the present disclosure is not limited to this. The present disclosure may be applied also to a printer which performs printing on a recording medium different from the recording paper sheet, such as a T-shirt, a sheet for outdoor advertisement, a case of a mobile terminal such as a smartphone, etc., a corrugated cardboard, a resin material, etc. Further, the present disclosure may be applied also to a liquid discharge apparatus which discharges a liquid different from the ink, such as a liquified resin or metal, etc.

What is claimed is:

1. A liquid discharge apparatus comprising:

a liquid discharge head in which a nozzle is opened;

an electrode facing the nozzle;

a power supply configured to apply voltage to the liquid discharge head so as to generate a potential difference between the liquid discharge head and the electrode;

a first output unit electrically connected to either one of the electrode and the liquid discharge head, and configured to output a first signal in accordance with an electric change in a case that the liquid discharge head is caused to perform inspection driving for discharging the liquid from the nozzle toward the electrode in a state that the liquid discharge head and the electrode are caused to face each other;

a low-pass filter electrically connected to the liquid discharge head;

a second output unit electrically connected to the liquid discharge head via the low-pass filter;

a high-pass filter electrically connected to the liquid discharge head;

a third output unit electrically connected to the liquid discharge head via the high-pass filter; and a controller configured to execute:

determination as to whether or not the liquid is normally discharged from the nozzle, based on the first signal; and determination as to whether or not a short circuit occurs between the liquid discharge head and the electrode, based on a second signal output from the second output unit and a third signal output from the third output unit.

2. The liquid discharge apparatus according to claim 1, further comprising a main circuit configured to electrically connect the power supply and the liquid discharge head, wherein the low-pass filter is provided on the main circuit, and the second output unit is electrically connected to a first connecting part, of the main circuit, which is located between the power supply and the low-pass filter.

3. The liquid discharge apparatus according to claim 2, further comprising another low-pass filter which is different from the low-pass filter, wherein the another low-pass filter is connected between the first connecting part and the second output unit.

4. The liquid discharge apparatus according to claim 2, wherein the third output unit is electrically connected to a second connecting part, of the main circuit, which is located between the liquid discharge head and the low-pass filter, and the high-pass filter is connected between the third output unit and the second connecting part.

5. The liquid discharge apparatus according to claim 4, further comprising a latched circuit connected between the high-pass filter and the third output unit.

6. The liquid discharge apparatus according to claim 4, wherein the first output unit is electrically connected to the second connecting part, and the high-pass filter is connected between the first output unit and the second connecting part.

7. The liquid discharge apparatus according to claim 6, further comprising an amplifier circuit connected between the high-pass filter and the first output unit, wherein the third output unit is connected to the high-pass filter not via the amplifier circuit.

8. The liquid discharge apparatus according to claim 2, further comprising an electric discharging part configured to perform electric discharge from the liquid discharge head, wherein the electric discharging part is electrically connected to a third connecting part, of the main circuit, which is located between the liquid discharge head and the low-pass filter.

9. The liquid discharge apparatus according to claim 1, further comprising:

a main circuit configured to electrically connect the power supply and the liquid discharge head; and an electric discharging part configured to perform electric discharge from the liquid discharge head, wherein each of the second output unit and the third output unit is electrically connected to the main circuit; and the electric discharging part is electrically connected to a third connecting part, of the main circuit, which is located at a position closer to the liquid discharge head than other parts, of the main circuit, to each of which one of the second output unit and the third output unit is connected.

10. The liquid discharge apparatus according to claim 5, further comprising an electric discharging part configured to perform electric discharge from the liquid discharge head, wherein the electric discharging part is electrically connected to the latched circuit, and the electric discharging part is configured to switch between performing the electric discharge from the liquid discharge head and not performing the electric discharge from the liquid discharge head, based on a signal output from the latched circuit.

11. The liquid discharge apparatus according to claim 1, further comprising an electric discharging part configured to perform electric discharge from the liquid discharge head, wherein the electric discharging part is electrically connected to the second output unit, and the electric discharging part is configured to switch between performing the electric discharge from the liquid discharge head and not performing the electric discharge from the liquid discharge head, based on the second signal.

12. The liquid discharge apparatus according to claim 1, further comprising an electric discharging part configured to perform electric discharge from the liquid discharge head, wherein the controller is configured to output an electric discharge instruction signal for instructing performing the electric discharge from the liquid discharge head in a case that the controller determines, based on the second signal and the third signal, that the liquid discharge head and the electrode are short circuited, and the electric discharging part is configured to perform the electric discharge from the liquid discharge head in a case that the electric discharging part receives the electric discharge instruction signal.

* * * * *